(12) United States Patent
Roustant et al.

(10) Patent No.: US 10,909,125 B2
(45) Date of Patent: Feb. 2, 2021

(54) ASYMMETRIC RANK-BIASED OVERLAP

(71) Applicant: salesforce.com, inc., San Francisco, CA (US)

(72) Inventors: Bruno Roustant, Froges (FR); Christian Posse, Belmont, CA (US)

(73) Assignee: salesforce.com, inc., San Francisco, CA (US)

(*) Notice: Subject to any disclaimer, the term of this patent is extended or adjusted under 35 U.S.C. 154(b) by 360 days.

(21) Appl. No.: 15/986,182

(22) Filed: May 22, 2018

(65) Prior Publication Data

US 2019/0361985 A1    Nov. 28, 2019

(51) Int. Cl.
  *G06F 16/2457* (2019.01)
  *G06F 11/36* (2006.01)

(52) U.S. Cl.
  CPC .... *G06F 16/24578* (2019.01); *G06F 11/3608* (2013.01)

(58) Field of Classification Search
  CPC ............ G06F 16/24578; G06F 11/3608
  USPC ............................................. 707/723
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

*Primary Examiner* — Aleksandr Kerzhner
*Assistant Examiner* — Aryan D Toughiry
(74) *Attorney, Agent, or Firm* — Dergosits & Noah LLP; Todd A. Noah

(57) ABSTRACT

A system associates sequentially descending weights with items in a reference list. The system identifies overlapping items from the first position to the second position in both the reference list and a test list. The system determines a weighted overlap for the overlapping items by combining the weights for each overlapping item to create a reference item weight, combining the weights for each item from the first position to the second position in the reference list to create a reference position weight, and determining the ratio between the reference item weight and the reference position weight. The system identifies overlapping items from the first position to the third position in both the reference list and the test list, and then determines a weighted overlap for these overlapping items. The system outputs the average weighted overlap as an efficiency evaluation of the information retrieval system that created the test list.

20 Claims, 9 Drawing Sheets

For the reference list $L_{ref}$ {a, b, c, d} and the first test list $L_1$ {c, a, b, d}, the overlap of $L_{ref}$ and $L_1$ at position 1 is {a} ∩ {c} = 0 items { } / 1 position = 0 / 1 = 0.0, the overlap of $L_{ref}$ and $L_1$ at positions 1 – 2 is {a, b} ∩ {c, a} = 1 item {a} / 2 positions = 1 / 2 = 0.5, the overlap of $L_{ref}$ and $L_1$ at positions 1 – 3 is {a, b, c} ∩ {c, a, b} = 3 items {a, b, c} / 3 positions = 3 / 3 = 1.0, the overlap of $L_{ref}$ and $L_1$ at positions 1 – 4 is {a, b, c, d} ∩ {c, a, b, d} = 4 items {a, b, c, d} / 4 positions = 4 / 4 = 1.0, and the Average Overlap metric for $L_{ref}$ and $L_1$ is the average of the overlaps (0.0 + 0.5 + 1.0 + 1.0) / 4 = 2.5 / 4 = 0.625.

For the reference list $L_{ref}$ {a, b, c, d} and the second test list $L_2$ {c, b, a, d}, the overlap of $L_{ref}$ and $L_2$ at position 1 is {a} ∩ {c} = 0 items { } / 1 position = 0 / 1 = 0.0, the overlap of $L_{ref}$ and $L_2$ at positions 1 – 2 is {a, b} ∩ {c, b} = 1 item {b} / 2 positions = 1 / 2 = 0.5, the overlap of $L_{ref}$ and $L_2$ at positions 1 – 3 is {a, b, c} ∩ {c, b, a} = 3 items {a, b, c} / 3 positions = 3 / 3 = 1.0, the overlap of $L_{ref}$ and $L_2$ at positions 1 – 4 is {a, b, c, d} ∩ {c, b, a, d} = 4 items {a, b, c, d} / 4 positions = 4 / 4 = 1.0, and the Average Overlap metric for $L_{ref}$ and $L_2$ is the average of the overlaps (0.0 + 0.5 + 1.0 + 1.0) / 4 = 2.5 / 4 = 0.625.

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0235216 A1* | 9/2008 | Ruttenberg ............ G06Q 30/02 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0248614 A1* | 10/2009 | Bhagwan ............... G06F 16/951 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0117329 A1* | 4/2016 | Busey ................... G06F 16/287 707/726 |
| 2016/0132601 A1* | 5/2016 | Nice ................... G06F 16/9535 707/754 |
| 2017/0364579 A1* | 12/2017 | Yadati ..................... G06F 16/30 |

\* cited by examiner

For the reference list $L_{ref}$ {$a, b, c, d$} and the first test list $L_1$ {$c, a, b, d$}, the overlap of $L_{ref}$ and $L_1$ at position 1 is {$a$} ∩ {$c$} = 0 items { } / 1 position = 0 / 1 = 0.0, the overlap of $L_{ref}$ and $L_1$ at positions 1 – 2 is {$a, b$} ∩ {$c, a$} = 1 item {$a$} / 2 positions = 1 / 2 = 0.5, the overlap of $L_{ref}$ and $L_1$ at positions 1 – 3 is {$a, b, c$} ∩ {$c, a, b$} = 3 items {$a, b, c$} / 3 positions = 3 / 3 = 1.0, the overlap of $L_{ref}$ and $L_1$ at positions 1 – 4 is {$a, b, c, d$} ∩ {$c, a, b, d$} = 4 items {$a, b, c, d$} / 4 positions = 4 / 4 = 1.0, and the Average Overlap metric for $L_{ref}$ and $L_1$ is the average of the overlaps (0.0 + 0.5 + 1.0 + 1.0) / 4 = 2.5 / 4 = 0.625.

FIG. 1A

For the reference list $L_{ref}$ {$a, b, c, d$} and the second test list $L_2$ {$c, b, a, d$}, the overlap of $L_{ref}$ and $L_2$ at position 1 is {$a$} ∩ {$c$} = 0 items { } / 1 position = 0 / 1 = 0.0, the overlap of $L_{ref}$ and $L_2$ at positions 1 – 2 is {$a, b$} ∩ {$c, b$} = 1 item {$b$} / 2 positions = 1 / 2 = 0.5, the overlap of $L_{ref}$ and $L_2$ at positions 1 – 3 is {$a, b, c$} ∩ {$c, b, a$} = 3 items {$a, b, c$} / 3 positions = 3 / 3 = 1.0, the overlap of $L_{ref}$ and $L_2$ at positions 1 – 4 is {$a, b, c, d$} ∩ {$c, b, a, d$} = 4 items {$a, b, c, d$} / 4 positions = 4 / 4 = 1.0, and the Average Overlap metric for $L_{ref}$ and $L_2$ is the average of the overlaps (0.0 + 0.5 + 1.0 + 1.0) / 4 = 2.5 / 4 = 0.625.

FIG. 1B

For the reference list $L_{ref}$ {$a, b, c, d$} and the first test list $L_1$ {$c, a, b, d$}, the overlap of $L_{ref}$ and $L_1$ at position 1 is {$a$} ∩ {$c$} = position weight 1 * 0 items { } / 1 position = $(0.5)^0$ * 0 / 1 = 0.0, the overlap of $L_{ref}$ and $L_1$ at positions 1 – 2 is {$a, b$} ∩ {$c, a$} = position weight 2 * 1 item {$a$} / 2 positions = $(0.5)^1$ * 1 / 2 = 0.25, the overlap of $L_{ref}$ and $L_1$ at positions 1 – 3 is {$a, b, c$} ∩ {$c, a, b$} = position weight 3 * 3 items {$a, b, c$} / 3 positions = $(0.5)^2$ * 3 / 3 = 0.25, the overlap of $L_{ref}$ and $L_1$ at positions 1 – 4 is {$a, b, c, d$} ∩ {$c, a, b, d$} = position weight 4 * 4 items {$a, b, c, d$} / 4 positions = $(0.5)^3$ * 4 / 4 = 0.125, and the Rank-Biased Overlap metric for $L_{ref}$ and $L_1$ is the weighted average of the overlaps (0.5) * (0.0 + 0.25 + 0.25 + 0.125) / 4 = 0.3125 / 4 = 0.078125.

FIG. 2A

For the reference list $L_{ref}$ {$a, b, c, d$} and the second test list $L_2$ {$c, b, a, d$}, the overlap of $L_{ref}$ and $L_2$ at position 1 is {$a$} ∩ {$c$} = position weight 1 * 0 items { } / 1 position = $(0.5)^0$ * 0 / 1 = 0.0, the overlap of $L_{ref}$ and $L_2$ at positions 1 – 2 is {$a, b$} ∩ {$c, b$} = position weight 2 * 1 item {$b$} / 2 positions = $(0.5)^1$ * 1 / 2 = 0.25, the overlap of $L_{ref}$ and $L_2$ at positions 1 – 3 is {$a, b, c$} ∩ {$c, b, a$} = position weight 3 * 3 items {$a, b, c$} / 3 positions = $(0.5)^2$ * 3 / 3 = 0.25, the overlap of $L_{ref}$ and $L_2$ at positions 1 – 4 is {$a, b, c, d$} ∩ {$c, b, a, d$} = position weight 4 * 4 items {$a, b, c, d$} / 4 positions = $(0.5)^3$ * 4 / 4 = 0.125, and the Rank-Biased Overlap metric for $L_{ref}$ and $L_2$ is the weighted average of the overlaps (0.5) * (0.0 + 0.25 + 0.25 + 0.125) / 4 = 0.3125 / 4 = 0.078125.

FIG. 2B

For the reference list $L_{ref}$ {$a, b, c, d$} and the first test list $L_1$ {$c, a, b, d$}, the item-weighted overlap of $L_{ref}$ and $L_1$ at position 1 is {$a$} ∩ {$c$} = 0 items { } / 1 position = 0 reference item weight ( ) / [1st reference position weight (1/1)]

= 0 / 1 = 0.0, the item-weighted overlap of $L_{ref}$ and $L_1$ at positions 1 – 2 is {$a, b$} ∩ {$c, a$} = 1 item {$a$} / 2 positions = [$a$ reference item weight (1/1)] / [1st reference position weight (1/1) + 2nd reference position weight (1/2)]

= [1] / [1 + ½] = 1/1.5 = 0.666, the item-weighted overlap of $L_{ref}$ and $L_1$ at positions 1 – 3 is {$a, b, c$} ∩ {$c, a, b$} = 3 items {$a, b, c$} / 3 positions = [$a$ reference item weight (1/1) + $b$ reference item weight (1/2) + $c$ reference item weight (1/3)] /
[1st reference position weight (1/1) + 2nd reference position weight (1/2) + 3rd reference position weight (1/3)]

= [(1/1) + (1/2) + (1/3)] / [(1/1) + (1/2) + (1/3)] = 1.8333/1.8333 = 1.0, the item-weighted overlap of $L_{ref}$ and $L_1$ at positions 1 – 4 is {$a, b, c, d$} ∩ {$c, a, b, d$} = 4 items {$a, b, c, d$} / 4 positions = [$a$ reference item weight (1/1) + $b$ reference item weight (1/2) + $c$ reference item weight (1/3) + $d$ reference item weight (1/4) /
[1st reference position weight (1/1) + 2nd reference position weight (1/2) + 3rd reference position weight (1/3) + 4th reference position weight (1/4)]

= [(1/1) + (1/2) + (1/3) + (1/4)] / [(1/1) + (1/2) + (1/3) + (1/4)] = 2.08333/2.08333 = 1.0, and the item-weighted overlap metric for $L_{ref}$ and $L_1$ is the average of the item-weighted overlaps (0.0 + 0.666 + 1.0 + 1.0) / 4 = 2.666 / 4 = 0.666.

FIG. 3A

For the reference list $L_{ref}\{a, b, c, d\}$ and the second test list $L_2\{c, b, a, d\}$, the item-weighted overlap of $L_{ref}$ and $L_2$ at position 1 is $\{a\} \cap \{c\} = 0$ items $\{\}$ / 1 position = 0 reference item weight ( ) / [1$^{st}$ reference position weight (1/1)]

= 0 / 1 = 0.0, the item-weighted overlap of $L_{ref}$ and $L_2$ at positions 1 – 2 is $\{a, b\} \cap \{c, b\} = 1$ item $\{b\}$ / 2 positions = [b reference item weight (1/2)] / [1$^{st}$ reference position weight (1/1) + 2$^{nd}$ reference position weight (1/2)]

= [1/2] / [1 + ½] = 0.5/1.5 = 0.333, the item-weighted overlap of $L_{ref}$ and $L_2$ at positions 1 – 3 is $\{a, b, c\} \cap \{c, b, a\} = 3$ items $\{a, b, c\}$ / 3 positions = [a reference item weight (1/1) + b reference item weight (1/2) + c reference item weight (1/3)] /
[1$^{st}$ reference position weight (1/1) + 2$^{nd}$ reference position weight (1/2) + 3$^{rd}$ reference position weight (1/3)]

= [(1/1) + (1/2) + (1/3)] / [(1/1) + (1/2) + (1/3)] = 1.8333/1.8333 = 1.0, the item-weighted overlap of $L_{ref}$ and $L_2$ at positions 1 – 4 is $\{a, b, c, d\} \cap \{c, b, a, d\} = 4$ items $\{a, b, c, d\}$ / 4 positions = [a reference item weight (1/1) + b reference item weight (1/2) + c reference item weight (1/3) + d reference item weight (1/4) /
[1$^{st}$ reference position weight (1/1) + 2$^{nd}$ reference position weight (1/2) + 3$^{rd}$ reference position weight (1/3) + 4$^{th}$ reference position weight (1/4)]

= [(1/1) + (1/2) + (1/3) + (1/4)] / [(1/1) + (1/2) + (1/3) + (1/4)] = 2.08333/2.08333 = 1.0, and the item-weighted overlap metric for $L_{ref}$ and $L_j$ is the average of the item-weighted overlaps (0.0 + 0.333 + 1.0 + 1.0) / 4 = 2.333 / 4 = 0.58333

FIG. 3B

For the reference list $L_{ref}$ {$a, b, c, d$} and the first test list $L_1$ {$c, a, b, d$}, the item and position weighted overlap of $L_{ref}$ and $L_1$ at position 1 is {$a$} ∩ {$c$} = 0 items { } / 1 position = position weight 1 * 0 reference item weight ( ) / [1$^{st}$ reference position weight (1/1)]

= $(0.5)^0$ * 0 / 1 = 0.0, the item and position weighted overlap of $L_{ref}$ and $L_1$ at positions 1 – 2 is {$a, b$} ∩ {$c, a$} = 1 item {$a$} / 2 positions = position weight 2 * [$a$ reference item weight (1/1)] / [1$^{st}$ reference position weight (1/1) + 2$^{nd}$ reference position weight (1/2)]

= $(0.5)^1$ * [1] / [1 + ½] = 0.5/1.5 = 0.333, the item and position weighted overlap of $L_{ref}$ and $L_1$ at positions 1 – 3 is {$a, b, c$} ∩ {$c, a, b$} = 3 items {$a, b, c$} / 3 positions = position weight 3 * [$a$ reference item weight (1/1) + $b$ reference item weight (1/2) + $c$ reference item weight (1/3)] / [1$^{st}$ reference position weight (1/1) + 2$^{nd}$ reference position weight (1/2) + 3$^{rd}$ reference position weight (1/3)]

= $(0.5)^2$ * [(1/1) + (1/2) + (1/3)] / [(1/1) + (1/2) + (1/3)] = 0.458333/1.8333 = 0.25, the item and position weighted overlap of $L_{ref}$ and $L_1$ at positions 1 – 4 is {$a, b, c, d$} ∩ {$c, a, b, d$} = 4 items {$a, b, c, d$} / 4 positions = position weight 4 * [$a$ reference item weight (1/1) + $b$ reference item weight (1/2) + $c$ reference item weight (1/3) + $d$ reference item weight (1/4) / [1$^{st}$ reference position weight (1/1) + 2$^{nd}$ reference position weight (1/2) + 3$^{rd}$ reference position weight (1/3) + 4$^{th}$ reference position weight (1/4)]

= $(0.5)^3$ * [(1/1) + (1/2) + (1/3) + (1/4)] / [(1/1) + (1/2) + (1/3) + (1/4)] = 0.26041666/2.08333 = 0.125, and the Asymmetric Rank-Biased Overlap metric for $L_{ref}$ and $L_1$ is the weighted average of the item and position weighted overlaps (0.5) * (0.0 + 0.333 + 0.25 + 0.125) / 4 = 0.3541666 / 4 = 0.08854166.

FIG. 3C

For the reference list $L_{ref}$ {$a$, $b$, $c$, $d$} and the second test list $L_2$ {$c$, $b$, $a$, $d$}, the item and position weighted overlap of $L_{ref}$ and $L_2$ at position 1 is {$a$} ∩ {$c$} = 0 items { } / 1 position = position weight 1 * 0 reference item weight ( ) / [$1^{st}$ reference position weight (1/1)]

= $(0.5)^0$ * 0 / 1 = 0.0, the item and position weighted overlap of $L_{ref}$ and $L_2$ at positions 1 – 2 is {$a$, $b$} ∩ {$c$, $b$} = 1 item {$b$} / 2 positions = position weight 2 * [$b$ reference item weight (1/2)] / [$1^{st}$ reference position weight (1/1) + $2^{nd}$ reference position weight (1/2)]

= $(0.5)^1$ * [1/2] / [1 + ½] = 0.25/1.5 = 0.1666, the item and position weighted overlap of $L_{ref}$ and $L_2$ at positions 1 – 3 is {$a$, $b$, $c$} ∩ {$c$, $b$, $a$} = 3 items {$a$, $b$, $c$} / 3 positions = position weight 3 * [$a$ reference item weight (1/1) + $b$ reference item weight (1/2) + $c$ reference item weight (1/3)] /
[$1^{st}$ reference position weight (1/1) + $2^{nd}$ reference position weight (1/2) + $3^{rd}$ reference position weight (1/3)]

= $(0.5)^2$ * [(1/1) + (1/2) + (1/3)] / [(1/1) + (1/2) + (1/3)] = 0.458333/1.8333 = 0.25, the item and position weighted overlap of $L_{ref}$ and $L_2$ at positions 1 – 4 is {$a$, $b$, $c$, $d$} ∩ {$c$, $b$, $a$, $d$} = 4 items {$a$, $b$, $c$, $d$} / 4 positions = position weight 4 * [$a$ reference item weight (1/1) + $b$ reference item weight (1/2) + $c$ reference item weight (1/3) + $d$ reference item weight (1/4) /
[$1^{st}$ reference position weight (1/1) + $2^{nd}$ reference position weight (1/2) + $3^{rd}$ reference position weight (1/3) + $4^{th}$ reference position weight (1/4)]

= $(0.5)^3$ * [(1/1) + (1/2) + (1/3) + (1/4)] / [(1/1) + (1/2) + (1/3) + (1/4)] = 0.26041666/2.08333 = 0.125, and the Asymmetric Rank-Biased Overlap metric for $L_{ref}$ and $L_1$ is the weighted average of the item and position weighted overlaps (0.5) * (0.0 + 0.1666 + 0.25 + 0.125) / 4 = 0.2708333 / 4 = 0.067708333.

FIG. 3D

ASYMMETRIC RANK-BIASED OVERLAP

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Information retrieval systems can provide ranked lists to system users. For example, a search engine responds to a user's query by providing a ranked list of results that are listed in an order that begins with the result that is ranked as most relevant to the user's query, then the result that is ranked as the second most relevant to the user's query, then the result that is ranked as the third most relevant to the user's query, etc. A ranked list is characterized as top-weighted if the top of a ranked list is more important than the bottom of the ranked list. For example, a user who submits a query is more likely to access the web page links at the top of a search engine's ranked list than the user is likely to access the web page links that are lower down the ranked list. A ranked list is characterized as indefinite if only a first small fraction of the ranked list is processed. The provider of a ranked list could continue to list items until all items were listed, but the cost involved is decreasingly justified by the utility obtained. For example, a search engine could allow a user to scroll through two million results for the query "holiday ideas," but the user is unlikely to scroll any deeper than the first few pages of results. Therefore, when a provider or a user of a ranked list decides to truncate the ranked list at any particular depth of results, such a decision is essentially arbitrary. A ranked list is characterized as incomplete if the ranked list does not provide a full list of items. For example, a celebrity web site lists the ten most eligible bachelors, instead of listing the entire population of marriageable men. These characteristics of a ranked list are related. If a ranked list is top-weighted, then value decays with results depth, such that decaying value motivates a truncation of the ranked list at some arbitrary results depth, and the truncation makes the ranked list incomplete.

Such ranked lists may be compared, and the goal of the comparison could be to infer the similarity of the processes that have generated the ranked lists. For example, two search engines' ranked list results are compared over a series of queries, and the comparisons are used to evaluate the retrieval algorithms of the search engines. The objective comparison of ranked lists requires a similarity measure that adapts to items that are in one ranked list but are not in another ranked list, and is applicable for whatever ranked list depth is available from the ranked list provider or accessed by the user, instead of a similarity measure that is based on arbitrarily assigning a ranked list truncation depth.

The Average Overlap (AO) metric is a similarity measure that uses set intersections to compare ranked lists. S and T are two infinite ranked lists, and $S_i$ is the item at rank i in the ranked list S. $S_{c:d}$ is the set of the items from the position c to the position d in the ranked list S, that is $\{S_i: c \le i \le d\}$. $S_{:d}$ is equivalent to $S_{1:d}$, and $S_{c:}$ is equivalent to $S_{c:\infty}$. At depth d, the intersection of ranked lists S and T to depth d is:

$$I_{S,T,d} = S_{:d} \cap T_{:d} \qquad \text{(Eq. 1)}$$

The size of the intersection is the overlap of S and T at depth d:

$$X_{S,T,d} = |I_{S,T,d}| \qquad \text{(Eq. 2)}$$

The proportion of S and T that overlap at depth d is their agreement:

$$A_{S,T,d} = X_{S,T,d}/d. \qquad \text{(Eq. 3)}$$

For brevity, $I_d$, $X_d$, and $A_d$ are used when the ranked lists that are being compared is unambiguous. The Average Overlap metric is:

$$AO(S,T,k) = (1/k)\Sigma_{d=1}^{k} A_d \qquad \text{(Eq. 4)}$$

where k is the evaluation depth.

The Average Overlap metric does not compare ranked lists that have different numbers of items.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 1A-B depict example calculations for the Average Overlap metric;

FIGS. 2A-B depict example calculations for the Rank-Biased Overlap metric;

FIGS. 3A-D depict example calculations for the Asymmetric Rank-Biased Overlap metric, in an embodiment;

DETAILED DESCRIPTION

General Overview

Figure 4:
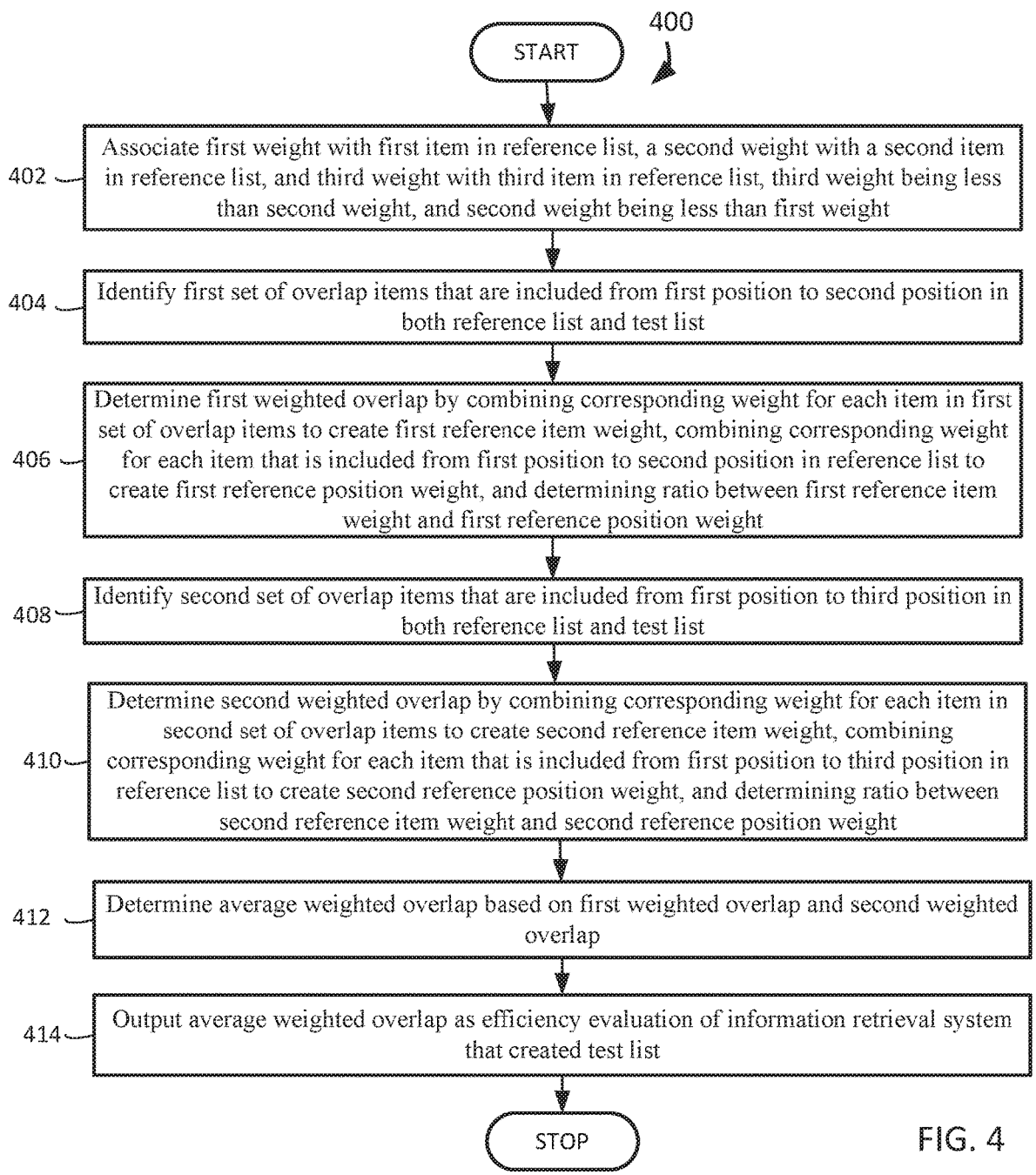
FIG. 4 depicts an operational flow diagram illustrating a high-level overview of a method for Asymmetric Rank-Biased Overlap, in an embodiment.

The Rank-Biased Overlap (RBO) metric is a similarity measure that initially uses the Average Overlap metric's set intersections, and then compensates for some shortcomings of the Average Overlap metric, such as introducing a rank bias based on a convergent geometric series, and comparing ranked lists with different numbers of items. The Average Overlap metric considers only the size of the intersection between ranked lists. The Rank-Biased Overlap metric consider the size of the intersection and introduces a decreasing weight for each rank, symmetrically on each list to compare. But none take into account that the lists are not symmetric, although in practice there is a reference list to which a test list is compared to measure the similarity. An item at rank i in the reference list is more important than an item at rank j in the reference list, when i<j. The test list elements ordering may differ, the goal is to measure how similar the test list is to the reference list. For example, FIGS. 1A-B depict example calculations for the Average Overlap metric for a reference ranked list $L_{ref}$ that includes the ranked items {a, b, c, d}, a first test list $L_1$ that includes the ranked items {c, a, b, d}, and a second test list $L_2$ that includes the ranked items {c, b, a, d}.

The Average Overlap calculations examine the items from the starting position to another position in both the reference list and a test list to identify a set of overlapping items, and then divide the number of overlapping items in the set by the number of positions examined to calculate the overlap metric for the examined positions. In a first example, FIG. 1A depicts that since $L_{ref}$ ranks the item a in the first position, and $L_1$ ranks the item c in the first position, the overlap of the first position of $L_{ref}$ and $L_1$ is an empty set, and divides the number of items in the empty set (0) by the number of positions examined (position 1 is 1 position) to result in the first overlap metric of 0.0 (0 items divided by 1 position) for the first position.

In a second example, FIG. 1A depicts that since $L_{ref}$ ranks the items a and b in the first two positions, and $L_1$ ranks the items c and a in the first two positions, the overlap of the first two positions of $L_{ref}$ and $L_1$ is a set that includes the item a, and divides the number of items in the set (a is 1 item) by the number of positions examined (positions 1 and 2 are 2 positions) to result in the second overlap metric of 0.5 (1 item divided by 2 positions) for the first two positions.

In a third example, FIG. 1A depicts that since $L_{ref}$ ranks the items a, b, and c in the first three positions, and $L_1$ ranks the items c, a, and b in the first three positions, the overlap of the first three positions of $L_{ref}$ and $L_1$ is a set that includes the items a, b, and c, and divides the number of items in the set (a, b, and c are 3 items) by the number of positions examined (positions 1, 2, and 3 are 3 positions) to result in the third overlap metric of 1.0 (3 items divided by 3 positions) for the first three positions.

In a fourth example, FIG. 1A depicts that since $L_{ref}$ ranks the items a, b, c, and d in the first four positions, and $L_1$ ranks the items c, a, b, and d in the first four positions, the overlap of the first four positions of $L_{ref}$ and $L_1$ is a set that includes the items a, b, c, and d, and divides the number of items in the set (a, b, c, and d are 4 items) by the number of positions examined (positions 1, 2, 3, and 4 are 4 positions) to result in the fourth overlap metric of 1.0 (4 items divided by 4 positions) for the first four positions.

After overlap metrics have been calculated for all of the position ranges in the reference list, the Average Overlap calculations sum each of the overlap metrics, and then divide the sum by the number of overlap metrics to produce an Average Overlap metric for the reference list and the test list. For example, FIG. 1A depicts that the 4 overlap metrics of 0.0, 0.5, 1.0, and 1.0 are summed to result in a total of 2.5, and the total of 2.5 is divided by 4 (the number of overlap metrics) to produce an Average Overlap metric of 0.625 for the ranked lists $L_{ref}$ and $L_1$.

FIG. 1B depicts the Average Overlap calculations that examine the items from the starting position to another position in the both the reference list $L_{ref}$ and a second test list $L_2$ to identify a set of overlapping items, and divide the number of overlapping items in the set by the number of positions examined to calculate the overlap metric for the examined positions. When examining the first position, the first three positions, and the first four positions, the sets of overlapping items are the same for both the test list $L_1$ and the second test list $L_2$. However, FIG. 1B depicts that since $L_{ref}$ ranks the items a and b in the first two positions, and $L_2$ ranks the items c and b in the first two positions, the overlap of the first two positions of $L_{ref}$ and $L_2$ is a set that includes the item b, whereas the overlap of the first two positions of $L_{ref}$ and $L_1$ is a set that includes the item a. Even though the overlap item sets {a} and {b} for the first two positions of $L_1$ and $L_2$, respectively, are different, FIG. 1B depicts that dividing the number of items in the set (b is 1 item) by the number of positions examined (positions 1 and 2 are 2 positions) results in the overlap metric of 0.5 (1 position divided by 2 positions) for the first two positions of $L_{ref}$ and $L_2$, which is the same overlap metric of 0.5 for the first two positions of $L_{ref}$ and $L_1$. Consequently, the 4 overlap metrics of 0.0, 0.5, 1.0, and 1.0 are summed to result in a total of 2.5, and the total of 2.5 is divided by 4 (the number of overlap metrics) to produce an Average Overlap metric of 0.625 for the ranked lists $L_{ref}$ and $L_2$. The Average Overlap calculations produced the same metric of 0.625 for each of the two test lists $L_1$ and $L_2$, even though these test lists had different levels of importance for the item a, which is the most important item for the reference list $L_{ref}$.

These examples demonstrate that the Average Overlap metric does not take into account that an item at a rank in the reference list is more important than an item at lower rank in the reference list. Ideally, a similarity measure should score the similarity of the first test list $L_1$ to the reference list $L_{ref}$ as higher than the similarity of the second test list $L_2$ to the reference list $L_{ref}$ because the first test list $L_1$ ranks the reference list's most important item a higher than the second test list $L_2$ ranks the reference list's most important item a. Although the example Average Overlap calculations are described for three ranked lists which each have four ranked items for simplification purposes, these Average Overlap calculations may be applied to any number of ranked lists that each have any number of ranked items.

The Rank-Biased Overlap compensates for some shortcomings of the Average Overlap metric, such as introducing a decreasing weight for each rank, symmetrically on each list to compare, and comparing ranked lists with different numbers of items. The Rank-Biased Overlap is an overlap-based rank similarity measure in the form:

$$\text{SIM}(S,T,w) = \Sigma_{d=1}^{\infty} w_d A_d \quad \text{(Eq. 5)}$$

where w is a vector of weights, and $w_d$ is the weight at position d. Then $0 \leq \text{SIM} \leq \Sigma_d w_d$, and if w is convergent, each $A_d$ has a fixed contribution $w_d/\Sigma_d w_d$. If w is not convergent, then the denominator of this expression goes to infinity. One such convergent series is the geometric progression, where the dth term has the value $p^{d-1}$, for $0 < p < 1$, and the infinite sum is:

$$\Sigma_{d=1}^{\infty} p^{d-1} = 1/(1-p) \quad \text{(Eq. 6)}$$

Setting $w_d$ to $(1-p) \, p^{d-1}$, so that $\Sigma_d w_d = 1$, derives the Rank-Biased Overlap metric:

$$\text{RBO}(S,T,p) = (1-p) * \Sigma_{d=1}^{\infty} p^{d-1} A_d \quad \text{(Eq. 7)}$$

The Rank-Biased Overlap calculations examine the items from the starting position to another position in both the reference list and a test list to identify a set of overlapping items, multiply the number of overlapping items in the set by a positional weight, and then divide the positionally-weighted number of overlapping items in the set by the number of positions examined to calculate the positionally-weighted overlap metric for the examined positions. As noted by Equations 6 and 7 above, the positional weight used by the Rank-Biased Overlap metric is $p^{d-1}$, where p is the probability that a user continues to the next item at the next position in a ranked list, and d is the depth, or position, of an item in a ranked list. For simplification purposes, the following examples use a value of 0.5 for p, such that the positional weight for the first position is $(0.5)^{1-1}=1.0$, the positional weight for the second position is $(0.5)^{2-1}=0.5$, the positional weight for the third position is $(0.5)^{3-1}=0.25$, and the positional weight for the fourth position is $(0.5)^{4-1}=0.125$.

In a first example, FIG. 2A depicts that since $L_{ref}$ ranks the item a in the first position, and $L_1$ ranks the item c in the first position, the overlap of the first position of $L_{ref}$ and $L_1$ is an empty set, and the number of items in the empty set (0) is multiplied by the first positional weight (1.0) and then divided by the number of positions examined (1) to result in the first positionally-weighted overlap metric of 0.0 (0 multiplied by 1 and then divided by 1) for the first position.

In a second example, FIG. 2A depicts that since $L_{ref}$ ranks the items a and b in the first two positions, and $L_1$ ranks the items c and a in the first two positions, the overlap of the first two positions of $L_{ref}$ and $L_1$ is a set that includes the item a, and the number of items in the set (1) is multiplied by the second positional weight (0.5) and then divided by the number of positions examined (2) to result in the second positionally-weighted overlap metric of 0.25 (1 multiplied by 0.5 and then divided by 2) for the first two positions.

In a third example, FIG. 2A depicts that since $L_{ref}$ ranks the items a, b, and c in the first three positions, and $L_1$ ranks the items c, a, and b in the first three positions, the overlap of the first three positions of $L_{ref}$ and $L_1$ is a set that includes the items a, b, and c, and the number of items in the set (3) is multiplied by the third positional weight (0.25) and then divided by the number of positions examined (3) to result in the third positionally-weighted overlap metric of 0.25 (3 multiplied by 0.25 and then divided by 3) for the first three positions.

In a fourth example, FIG. 2A depicts that since $L_{ref}$ ranks the items a, b, c, and d in the first four positions, and $L_1$ ranks the items c, a, b, and d in the first four positions, the overlap of the first four positions of $L_{ref}$ and $L_1$ is a set that includes the items a, b, c, and d, and the number of items in the set (4) is multiplied by the fourth positional weight (0.125) and then divided by the number of positions examined (4) to result in the fourth positionally-weighted overlap metric of 0.125 (4 multiplied by 0.125 and then divided by 4) for the first four positions.

After positionally-weighted overlap metrics have been calculated for all of the position ranges in the reference list, the Rank-Biased Overlap calculations sum each of the positionally-weighted overlap metrics, multiply the sum by the probability that a user does not continue to the next item at the next position in a ranked list, and then divides the probability-adjusted sum by the number of overlap metrics to produce a Rank-Biased Overlap metric for the reference list and the test list. For example, FIG. 2A depicts that the 4 probability-adjusted overlap metrics of 0.0, 0.25, 0.25, and 0.125 are summed to result in a total of 0.625, the summed total of 0.625 is multiplied by the probability of 0.5 (1−0.5) to produce the probability-adjusted sum of 0.3125, and the probability-adjusted total of 0.3125 is divided by 4 (the 4 positionally-weighted overlap metrics) to produce a Rank-Biased Overlap metric of 0.078125 for the ranked lists $L_{ref}$ and $L_1$.

In a similar example, FIG. 2B depicts that the 4 probability-adjusted overlap metrics of 0.0, 0.25, 0.25, and 0.125 are summed to result in a total of 0.625, the summed total of 0.625 is multiplied by the probability of 0.5 (1−0.5) to produce the probability adjusted sum of 0.3125, and the probability-adjusted total of 0.3125 is divided by 4 (the 4 positionally-weighted overlap metrics) to produce a Rank-Biased Overlap metric of 0.078125 for the ranked lists $L_{ref}$ and $L_2$. The Rank-Biased Overlap calculations produced the same metric of 0.078125 for each of the two test lists $L_1$ and $L_2$, even though these test lists had different levels of importance for the item a, which is the most important item for the reference list $L_{ref}$. These examples demonstrate that the Rank-Biased Overlap metric does not take into account that an item at a rank in the reference list is more important than an item at lower rank in the reference list. The reference list and the test list are not symmetric. Although the example Rank-Biased Overlap calculations are described for three ranked lists which each have four ranked items for simplification purposes, these Rank-Biased Overlap calculations may be applied to any number of ranked lists that each have any number of ranked items.

The Asymmetric Rank-Biased Overlap metric introduces the notion of asymmetry for comparing ranked lists, based on a reference list and at least one test list. With this asymmetry, the Asymmetric Rank-Biased Overlap metric is better adapted to evaluate a ranking algorithm to measure the relevancy quality or disruption. The items in the reference list are ordered by decreasing importance. An item at rank i in the reference list is more important, has more weight, than an item at rank j in this reference list, where i<j. Therefore, Equation (2), which is used by the Average Overlap metric and the Rank-Biased Overlap metric, is modified to become:

$$X_{S,T,d}=\Sigma_{i \in IS,T,d} W_{pos(i)} \quad \text{(Eq. 2A)}$$

where $W_{pos(i)}$ is the weight of the item i at position pos(i) in the reference list. This weight depends on the item position. It may be any positive value. Then Equation (3), which is used by the Average Overlap metric and the Rank-Biased Overlap metric, is modified to become:

$$A_{S,T,k}=X_{S,T,k}/\Sigma_{d=1}^{k} W_d \quad \text{(Eq. 3A)}$$

where $W_d$ is the weight of the item at position d in the reference list. These two Equations 2A and 3A remain identical to the Average Overlap metric's Equations 2 and 3, which are also the Rank-Biased Overlap metric's Equations 2 and 3, when $W_d$ is a constant. W may be any decreasing function. For example, W may be a linear decreasing function, such as $W_d=1-(d-1)/Kl$ where K is a constant, and l is the maximum position to be compared. W may be an inverted log function such as $W_d=1/\log(1+d)$. W may be the propensity score at position d. W may be the ranking score of the reference list, such as the search engine score. W may be 1/d.

In a first example, FIG. 3A depicts that since $L_{ref}$ ranks the item a in the first position, and $L_1$ ranks the item c in the first position, the overlap of the first position of $L_{ref}$ and $L_1$ is an empty set, the first reference item weight for the empty set equals 0.0 (0 weight for no items), the first reference position weight for the first position in $L_{ref}$ equals 1.0 (the decreasing function weight 1/1 for the item a in the first position), and that the first item-weighted overlap equals 0.0 (0.0 for the first reference item weight divided by 1.0 for the reference position weight).

In a second example, FIG. 3A depicts that since $L_{ref}$ ranks the items a and b in the first two positions, and $L_1$ ranks the items c and a in the first two positions, the overlap of the first two positions of $L_{ref}$ and $L_1$ is a set that includes the item a, the second reference item weight for the set {a} equals 1.0 (1/1 for the item a), the second reference position weight for the first two positions in the $L_{ref}$ equals 1.5 (1/1 for the item a in the first position, plus the decreasing function weight 1/2 for the item b in the second position), and that the second item-weighted overlap equals 0.666 (1.0 for the second reference item weight divided by 1.5 for the second reference position weight).

In a third example, FIG. 3A depicts that since $L_{ref}$ ranks the items a, b, and c in the first three positions, and $L_1$ ranks the items c, a, and b in the first three positions, the overlap of the first three positions of $L_{ref}$ and $L_1$ is a set that includes the items a, b, and c, the third reference item weight for the set {a, b, c} equals 1.8333 (1/1 for the item a, plus 1/2 for the item b, plus the decreasing function weight 1/3 for the item c), the third reference position weight for the first three positions in $L_{ref}$ equals 1.8333 (1/1 for the item a in the first position, plus 1/2 for the item b in the second position, plus 1/3 for the item c in the third position), and that the third item-weighted overlap equals 1.0 (1.8333 for the third reference item weight divided by 1.8333 for the third reference position weight).

In a fourth example, FIG. 3A depicts that since $L_{ref}$ ranks the items a, b, c, and d in the first four positions, and $L_1$ ranks the items c, a, b, and d in the first four positions, the overlap of the first four positions of $L_{ref}$ and $L_1$ is a set that includes the items a, b, c, and d, the fourth reference item weight for the set {a, b, c, d} equals 2.08333 (1/1 for the item a, plus 1/2 for the item b, plus 1/3 for the item c, plus the decreasing function weight 1/4 for the item d), the fourth reference position weight for the first four positions in $L_{ref}$ equals 2.08333 (1/1 for the item a in the first position, plus 1/2 for the item b in the second position, plus 1/3 for the item c in the third position, plus 1/4 for the item d in the fourth position), and that the fourth item-weighted overlap equals 1.0 (2.08333 for the fourth reference item weight divided by 2.08333 for the fourth reference position weight).

After item-weighted overlap metrics have been calculated for all of the position ranges in the reference list, the Asymmetric Rank-Biased Overlap metric calculations sum each of the item-weighted overlap metrics, and then divide the sum by the number of item-weighted overlap metrics to produce an Asymmetric Rank-Biased Overlap metric for the reference list and the test list. For example, FIG. 3A depicts that the 4 item-weighted overlap metrics of 0.0, 0.666, 1.0, and 1.0 are summed to result in a total of 2.666, and the total of 2.666 is divided by 4 (4 item-weighted overlap metrics) to produce an Asymmetric Rank-Biased Overlap metric of 0.666 for the ranked lists $L_{ref}$ and $L_1$.

FIG. 3B depicts the Asymmetric Rank-Biased Overlap calculations that examine the items from the starting position to another position in the both the reference list $L_{ref}$ and a second test list $L_2$ to identify a set of overlapping items. When examining the first position, the first three positions, and the first four positions, the sets of overlapping items are the same for both the test list $L_1$ and the second test list $L_2$. However, FIG. 3B depicts that since $L_{ref}$ ranks the items a and b in the first two positions, and $L_2$ ranks the items c and b in the first two positions, the overlap of the first two positions of $L_{ref}$ and $L_2$ is a set that includes the item b, whereas the overlap of the first two positions of $L_{ref}$ and $L_1$ is a set that includes the item a. Consequently, the second reference item weight for the overlap items set {b} equals 0.5 (1/2 for the item b), the second reference position weight for the first two positions in the reference list {a, b, c, d} equals 1.5 (1/1 for the item a in the first position, plus 1/2 for the item b in the second position), and that the second item-weighted overlap equals 0.333 (0.5 for the reference item weight divided by 1.5 for the reference position weight). The second item-weighted overlap of 0.333 for the first two positions of $L_2$ differs from the second item-weighted overlap of 0.666 for the first two positions of $L_1$. Therefore, the first item-weighted overlap of 0.0, plus the second item-weighted overlap of 0.333, plus the third item-weighted overlap of 1.0, plus the fourth item-weighted overlap of 1.0 for $L_2$ results in a total item-weighted overlap of 2.333 for $L_2$ and dividing the total item-weighted overlap of 2.333 for $L_2$ by 4 (4 item-weighted overlaps for the $L_2$) results in the Asymmetric Rank-Biased Overlap metric of 0.58333 for $L_2$, which differs from the Asymmetric Rank-Biased Overlap metric of 0.666 for $L_1$.

The Asymmetric Rank-Biased Overlap metric of 0.666 for the first test list {c, a, b, d} and the Asymmetric Rank-Biased Overlap metric of 0.58333 for the second test list {c, b, a, d} can enable a system user to evaluate the information retrieval system algorithm that provided the first test list {c, a, b, d} as more efficient than the information retrieval system algorithm that provided the second test list {c, b, a, d}. The Asymmetrical Rank-Biased Overlap calculations produced the metric of 0.666 for the test list $L_1$ and the metric of 0.58333 for the test list $L_2$ because these test lists had different levels of importance for the item a, which is the most important item for the reference list $L_{ref}$. These examples demonstrate that the Asymmetrical Rank-Biased Overlap metric takes into account that an item at rank in the reference list is more important than an item at lower rank in the reference list.

The Asymmetrical Rank-Biased Overlap similarity measure scores the similarity of the first test list $L_1$ to the reference list $L_{ref}$ as higher than the similarity of the second test list $L_2$ to the reference list $L_{ref}$ because the first test list $L_1$ ranks the reference list's most important item a higher than the second test list $L_2$ ranks the reference list's most important item a. Although the example Asymmetric Rank-Biased Overlap calculations are described for three ranked lists which each have four ranked items for simplification purposes, these Asymmetric Rank-Biased Overlap calculations may be applied to any number of ranked lists that each have any number of ranked items.

In addition to providing reference item weighting, the Asymmetrical Rank-Biased Overlap metric can incorporate the Rank-Biased Overlap metric's positional weights. In a first example, FIG. 3C depicts that since $L_{ref}$ ranks the item a in the first position, and $L_1$ ranks the item c in the first position, the overlap of the first position of $L_{ref}$ and $L_1$ is an empty set, the first position weight equals 1.0 ($0.5^{1-1}$), the first reference item weight for the empty set equals 0.0 (0 weight for no items), the first reference position weight for the first position in $L_{ref}$ equals 1.0 (the decreasing function weight 1/1 for the item a in the first position), and that the first item and position-weighted overlap equals 0.0 (1.0 for the first position weight, multiplied by 0.0 for the first reference item weight, divided by 1.0 for the reference position weight).

In a second example, FIG. 3C depicts that since $L_{ref}$ ranks the items a and b in the first two positions, and $L_1$ ranks the items c and a in the first two positions, the overlap of the first two positions of $L_{ref}$ and $L_1$ is a set that includes the item a, the second position weight equals 0.5 ($0.5^{2-1}$), the second reference item weight for the set {a} equals 1.0 (1/1 for the item a), the second reference position weight for the first two positions in the $L_{ref}$ equals 1.5 (1/1 for the item a in the first position, plus the decreasing function weight 1/2 for the item b in the second position), and that the second item and position-weighted overlap equals 0.333 (0.5 for the second position weight, multiplied by 1.0 for the second reference item weight, divided by 1.5 for the second reference position weight).

In a third example, FIG. 3C depicts that since $L_{ref}$ ranks the items a, b, and c in the first three positions, and $L_1$ ranks the items c, a, and b in the first three positions, the overlap of the first three positions of $L_{ref}$ and $L_1$ is a set that includes the items a, b, and c, the third position weight equals 0.25 ($0.5^{3-1}$), the third reference item weight for the set {a, b, c} equals 1.8333 (1/1 for the item a, plus 1/2 for the item b, plus the decreasing function weight 1/3 for the item c), the third reference position weight for the first three positions in $L_{ref}$ equals 1.8333 (1/1 for the item a in the first position, plus 1/2 for the item b in the second position, plus 1/3 for the item c in the third position), and that the third item and position-weighted overlap equals 0.25 (0.25 for the third position weight, multiplied by 1.8333 for the third reference item weight, divided by 1.8333 for the third reference position weight).

In a fourth example, FIG. 3C depicts that since $L_{ref}$ ranks the items a, b, c, and d in the first four positions, and $L_1$ ranks the items c, a, b, and d in the first four positions, the overlap of the first four positions of $L_{ref}$ and $L_1$ is a set that includes the items a, b, c, and d, the fourth position weight equals 0.125 ($0.5^{4-1}$), the fourth reference item weight for the set {a, b, c, d} equals 2.08333 (1/1 for the item a, plus 1/2 for the item b, plus 1/3 for the item c, plus the decreasing function weight 1/4 for the item d), the fourth reference position weight for the first four positions in $L_{ref}$ equals 2.08333 (1/1 for the item a in the first position, plus 1/2 for the item b in the second position, plus 1/3 for the item c in the third position, plus 1/4 for the item d in the fourth position), and that the fourth item and position-weighted overlap equals 0.125 (0.125 for the fourth position weight, multiplied by 2.08333 for the fourth reference item weight, divided by 2.08333 for the fourth reference position weight).

After item and position-weighted overlap metrics have been calculated for all of the position ranges in the reference list, the Asymmetric Rank-Biased Overlap metric calculations sum each of the item and position-weighted overlap metrics, multiply the sum by the probability that that a user does not continue to the next item at the next position in a ranked list, and then divide the probability-adjusted sum by the number of item and position-weighted overlap metrics to produce an Asymmetric Rank-Biased Overlap metric for the reference list and the test list. For example, FIG. 3C depicts that the 4 item and position-weighted overlap metrics of 0.0, 0.333, 0.25, and 0.125 are summed to result in a total of 0.708333, and the total of 0.708333 is multiplied by 0.5 (the probability that that a user does not continue to the next item at the next position in a ranked list) and divided by 4 (the number of item and position-weighted overlap metrics) to produce an Asymmetric Rank-Biased Overlap metric of 0.088541666 for the ranked lists $L_{ref}$ and $L_1$.

FIG. 3D depicts the Asymmetric Rank-Biased Overlap calculations that examine the items from the starting position to another position in the both the reference list $L_{ref}$ and a second test list $L_2$ to identify a set of overlapping items. When examining the first position, the first three positions, and the first four positions, the sets of overlapping items are the same for both the test list $L_1$ and the second test list $L_2$. However, FIG. 3D depicts that since $L_{ref}$ ranks the items a and b in the first two positions, and $L_2$ ranks the items c and b in the first two positions, the overlap of the first two positions of $L_{ref}$ and $L_2$ is a set that includes the item b, whereas the overlap of the first two positions of $L_{ref}$ and $L_1$ is a set that includes the item a. Consequently, the second position weight equals 0.5 ($0.5^{2-1}$), the second reference item weight for the overlap items set {b} equals 0.5 (1/2 for the item b), the second reference position weight for the first two positions in the reference list {a, b, c, d} equals 1.5 (1/1 for the item a in the first position, plus 1/2 for the item b in the second position), and that the second item and position-weighted overlap equals 0.1666 (0.5 for the second position weight, multiplied by 0.5 for the reference item weight, divided by 1.5 for the reference position weight). The second item and position-weighted overlap of 0.1666 for the first two positions of $L_2$ differs from the second item and position-weighted overlap of 0.333 for the first two positions of $L_1$. Therefore, the first item and position-weighted overlap of 0.0, plus the second item and position-weighted overlap of 0.1666, plus the third item and position-weighted overlap of 0.25, plus the fourth item and position-weighted overlap of 0.125 for $L_2$ results in a total item-weighted overlap of 0.541666 for $L_2$, and multiplying the total item and position-weighted overlap of 0.541666 for $L_2$ by 0.5 (the probability that that a user does not continue to the next item at the next position in a ranked list), and dividing by 4 (4 item-weighted overlaps for the $L_2$) results in the Asymmetric Rank-Biased Overlap metric of 0.067708333 for $L_2$, which differs from the Asymmetric Rank-Biased Overlap metric of 0.088541666 for $L_1$.

The Asymmetric Rank-Biased Overlap metric of 0.088541666 for the first test list {c, a, b, d} and the Asymmetric Rank-Biased Overlap metric of 0.067708333 for the second test list {c, b, a, d} can enable a system user to evaluate the information retrieval system algorithm that provided the first test list {c, a, b, d} as more efficient than the information retrieval system algorithm that provided the second test list {c, b, a, d}. The Asymmetrical Rank-Biased Overlap calculations produced the metric of 0.088541666 for the test list $L_1$ and the metric of 0.067708333 for the test list $L_2$ because these test lists had different levels of importance for the item a, which is the most important item for the reference list $L_{ref}$.

These examples demonstrate that the Asymmetrical Rank-Biased Overlap metric takes into account that an item at a rank in the reference list is more important than an item at lower rank in the reference list. The Asymmetrical Rank-Biased Overlap similarity measure scores the similarity of the first test list $L_1$ to the reference list $L_{ref}$ as higher than the similarity of the second test list $L_2$ to the reference list $L_{ref}$ because the first test list $L_1$ ranks the reference list's most important item a higher than the second test list $L_2$ ranks the reference list's most important item a. Although the example Asymmetric Rank-Biased Overlap calculations are described for three ranked lists which each have four ranked items for simplification purposes, these Asymmetric Rank-Biased Overlap calculations may be applied to any number of ranked lists that each have any number of ranked items.

In accordance with embodiments described herein, there are provided methods and systems for Asymmetric Rank-Biased Overlap. A system associates a first weight with a first item in a reference list, a second weight with a second item in the reference list, and a third weight with a third item in the reference list, the third weight being less than the second weight, and the second weight being less than the first weight. The system identifies a first set of overlap items that are included from a first position to a second position in both the reference list and a test list. The system determines a first weighted overlap by combining a corresponding weight for each item in the first set of overlap items to create a first reference item weight, combining a corresponding weight for each item that is included from the first position to the second position in the reference list to create a first reference position weight, and determining a ratio between the first reference item weight and the first reference position weight. The system identifies a second set of overlap items that are included from the first position to a third position in both the reference list and the test list. The system determines a second weighted overlap by combining a corresponding weight for each item in the second set of overlap items to create a second reference item weight, combining a corresponding weight for each item that is included from the first position to the third position in the reference list to create a second reference position weight, and determining a ratio between the second reference item weight and the second reference position weight. The system determines an average weighted overlap based on the first weighted overlap and the second weighted overlap. The system outputs the average weighted overlap as an efficiency evaluation of an information retrieval system that created the test list.

For example, a system assigns the decreasing function weight of 1/1 to the first item a, the decreasing function weight of 1/2 to the second item b, the decreasing function weight of 1/3 to the third item c, and the decreasing function weight 1/4 to the fourth item d in the reference list {a, b, c, d}. The system identifies the overlap items for the first position of the reference list {a, b, c, d} and the test list {c, a, b, d} as the empty set { }, identifies the overlap items for the first two positions of the reference list {a, b, c, d} and the test list {c, a, b, d} as the item a, identifies the overlap items for the first three positions of the reference list {a, b, c, d} and the test list {c, a, b, d} as the items a, b, and c, and identifies the overlap items for the first four positions of the reference list {a, b, c, d} and the first test list {c, a, b, d} as the items a, b, c, and d.

The system determines that the first reference item weight for the overlap items set { } equals 0.0 (0 for no items), the first reference position weight for the first position in the reference list {a, b, c, d} equals 1.0 (1/1 for the item a in the first position), and that the first item-weighted overlap equals 0.0 (0.0 for the first reference item weight divided by 1.0 for the reference position weight). The system determines that the second reference item weight for the overlap items set {a} equals 1.0 (1/1 for the item a), the second reference position weight for the first two positions in the reference list {a, b, c, d} equals 1.5 (1/1 for the item a in the first position, plus 1/2 for the item b in the second position), and that the second item-weighted overlap equals 0.666 (1.0 for the second reference item weight divided by 1.5 for the second reference position weight). The system determines that the third reference item weight for the overlap items set {a, b, C} equals 1.8333 (1/1 for the item a, plus 1/2 for the item b, plus 1/3 for the item c), the third reference position weight for the first three positions in the reference list {a, b, c, d} equals 1.8333 (1/1 for the item a in the first position, plus 1/2 for the item b in the second position, plus 1/3 for the item c in the third position), and that the third item-weighted overlap equals 1.0 (1.8333 for the third reference item weight divided by 1.8333 for the third reference position weight). The system determines that the fourth reference item weight for the overlap items set {a, b, c, d} equals 2.08333 (1/1 for the item a, plus 1/2 for the item b, plus 1/3 for the item c, plus 1/4 for the item d), the fourth reference position weight for the first four positions in the reference list {a, b, c, d} equals 2.08333 (1/1 for the item a in the first position, plus 1/2 for the item b in the second position, plus 1/3 for the item c in the third position, plus 1/4 for the item d in the fourth position), and that the fourth item-weighted overlap equals 1.0 (2.08333 for the fourth reference item weight divided by 2.08333 for the reference position weight).

The system averages the first item-weighted overlap of 0.0, the second item-weighted overlap of 0.666, the third item-weighted overlap of 1.0, and the fourth item-weighted overlap of 1.0 for the test list {c, a, b, d} to result in an average item-weighted overlap of 0.666 for the test list {c, a, b, d}. The system outputs the Asymmetric Rank-Biased Overlap metric of 0.666 for the test list {c, a, b, d} and the Asymmetric Rank-Biased Overlap metric of 0.58333 for a different test list {c, b, a, d}, which enables a system user to evaluate the information retrieval system algorithm that provided the test list {c, a, b, d} as more efficient than the information retrieval system algorithm that provided the different test list {c, b, a, d}.

Methods and systems are provided for Asymmetric Rank-Biased Overlap. First, a method for Asymmetric Rank-Biased Overlap will be described with reference to example embodiments. Then a system for Asymmetric Rank-Biased Overlap will be described.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 4 depicts an operational flow diagram illustrating a high-level overview of a method 400 for Asymmetric Rank-Biased Overlap. The method 400 may be implemented on either a centralized computing platform or in parallel on a distributed computing platform.

A first weight is associated with a first item in a reference list, a second weight is associated with a second item in the reference list, and a third weight is associated with a third item in the reference list, the third weight being less than the second weight, and the second weight being less than the first weight, block 402. The system assigns decreasing weights to items in a reference list. For example, and without limitation, this can include the system assigning the decreasing function weight of 1/1 to the first item a in the reference list {a, b, c, d}, the decreasing function weight of 1/2 to the second item b in the reference list {a, b, c, d}, the decreasing function weight of 1/3 to the third item c in the reference list {a, b, c, d}, and the decreasing function weight 1/4 to the fourth item d in the reference list {a, b, c, d}. Although this example uses the decreasing function weight 1/d, where d is the depth in the reference list, the system can use any decreasing function to assign weights to items in a reference list.

The first item may be in an item sequence in a reference list before the second item, the second item may be in the item sequence in the reference list before the third item, the first item may be ranked higher in the item sequence in the reference list than the second item is ranked in the item sequence in the reference list, and the second item may be ranked higher in the item sequence in the reference list than the third item is ranked in the item sequence in the reference list. For example, the item a is ranked higher than the item b in the reference list {a, b, c, d}, the item b is ranked higher than the item c in the reference list {a, b, c, d}, and the item c is ranked higher than the item d in the reference list {a, b, c, d}. A reference list can be information that includes a number of items written or printed consecutively, and which may be used as a standard. An item can be an individual thing, especially one that is part of a list. An item sequence can be a particular order in which things follow each other, especially in a list. A weight can be a factor associated with one of a set of numerical quantities, which is used to represent the importance of a thing relative to other things.

In addition to associating decreasing weights with items in a reference list, a first set of overlap items is identified as being included from a first position to a second position in both the reference list and a test list, block 404. The system identifies items that are common to position ranges in both a reference list and a test list. By way of example and without limitation, this can include the system identifying the overlap item set for the first two positions of the reference list {a, b, c, d} and the first test list {c, a, b, d} as the item a. In another example. the system identifies the overlap item set for the first two positions of the reference list {a, b, c, d} and the second test list {c, b, a, d} as the item b.

A first position may be in a positional sequence in a reference list before a second position, and the second position may be in the positional sequence in the reference list before a third position. For example, the first position of a in the positional sequence of a, b, c, and d for the reference list {a, b, c, d} is before the second position of b in the positional sequence of a, b, c, and d for the reference list {a, b, c, d}, the second position of b in the positional sequence of a, b, c, and d for the reference list {a, b, c, d} is before the third position of c in the positional sequence of a, b, c, and d for the reference list {a, b, c, d}, and the third position of c in the positional sequence of a, b, c, and d for the reference list {a, b, c, d} is before the fourth position of d in the positional sequence of a, b, c, and d for the reference list {a, b, c, d}. A first position may precede all other positions in the reference list. For example, the first position of a in the reference list {a, b, c, d} is before the positions of b, c, and d in the reference list {a, b, c, d}.

A first position in a list may be the same position as or different from a second position in the list. For example, when the first position is the same as the second position when identifying the first set of overlap items from a first position to a second position in both the reference list and a test list, then the system identifies the overlap item set for the first position through the second position of the reference list {a, b, c, d} as the intersection of the item a in the first position in the reference list {a, b, c, d} and the item b in the first position of the first test list {c, a, b, d}, which is the empty set { }.

A reference list may be created by an information retrieval system that differs from the information retrieval system that created a test list or an algorithm that differs from the algorithm used by the information retrieval system to create the test list. For example, a first information retrieval system created the reference list, a second information retrieval system created a first test list, and a third information retrieval system created a second test list. In another example, a first algorithm used by an information retrieval system created the reference list, a second algorithm used by the same information retrieval system created a first test list, and a third algorithm used by the same information retrieval system created a second test list.

A set can be a number of things that belong or are used together. An overlap item can be an individual thing that is shared, especially one that is part of at least two lists. A position can be a place where something is located or has been put, especially in a list. A test list can be information that includes a number of items written or printed consecutively, and which may be used in an experiment. A positional sequence can be particular order in which things follow each other in a place where things are located or have been put, especially in a list. An information retrieval system can be a group of related computer hardware units or programs or both, especially when dedicated to a single application for the tracing and recovery of specific data from storage. An algorithm can be a process or set of rules that is followed in calculations or other problem-solving operations, especially by a computer.

After identifying a first set of overlap items, a first weighted overlap is determined by combining a corresponding weight for each item in the first set of overlap items to create a first reference item weight, combining a corresponding weight for each item that is included from a first position to a second position in a reference list to create a first reference position weight, and determining a ratio between the first reference item weight and the first reference position weight, block 406. The system determines the weight of the overlapping items based on the weights assigned to the reference list's items. In embodiments, this can include the system determining that the first reference item weight for the overlap items set { } equals 0.0 (0 for no items), the first reference position weight for the first position in the reference list {a, b, c, d} equals 1.0 (1/1 for the item a in the first position), and that the first item-weighted overlap equals 0.0 (0.0 for the first reference item weight divided by 1.0 for the first reference position weight). In another example, the system determines the second reference item weight for the overlap items set {a} equals 1.0 (1/1 for the item a), the second reference position weight for the first two positions in the reference list {a, b, c, d} equals 1.5 (1/1 for the item a in the first position, plus 1/2 for the item b in the second position), and that the second item-weighted overlap equals 0.666 (1.0 for the second reference item weight divided by 1.5 for the second reference position weight).

Combining a corresponding weight for each item in a first set of overlap items to create a first reference item weight may include using a first convergent weight to modify a first summed reference item weight to create the first reference item weight, the first convergent weight may be a first weight in a convergent series. For example, the system determines that the first position weight equals 1.0 ($0.5^{1-1}$), the first reference item weight for the empty set equals 0.0 (0 weight for no items), the first reference position weight for the first position in the reference list {a, b, c, d} equals 1.0 (the decreasing function weight 1/1 for the item a in the first position), and that the first item and position-weighted overlap equals 0.0 (1.0 for the first position weight, multiplied by 0.0 for the first reference item weight, divided by 1.0 for the first reference position weight). In another example, the system determines that the second position weight equals 0.5 ($0.5^{2-1}$), the second reference item weight for the set {a} equals 1.0 (1/1 for the item a), the second reference position weight for the first two positions in the reference list {a, b, c, d} equals 1.5 (1/1 for the item a in the first position, plus the decreasing function weight 1/2 for the item b in the second position), and that the second item and position-weighted overlap equals 0.333 (0.5 for the second position weight, multiplied by 1.0 for the second reference item weight, divided by 1.5 for the second reference position weight).

A weighted overlap can be a factor associated with one of a set of numerical quantities, used to represent the importance of a thing relative to other things that are common to multiple lists. A reference item weight can be a factor associated with one of a set of numerical quantities, used to represent the importance of a thing relative to other things that may be used as a standard. A reference position weight can be a factor associated with one of a set of numerical quantities, used to represent the importance of a place of a thing relative to the places of other things that may be used as a standard. A ratio can be the quantitative relation between two amounts indicating the number of times one value contains or is contained within the other value. A convergent weight can be a factor associated with one of a set of numerical quantities, used to represent its importance relative to the other members of the set, and approaching a definite limit as more of its terms are added. A summed reference item weight can be a factor associated with one of a set of numerical quantities, used to represent the importance of aggregated things relative to the other things that may be used as a standard. A convergent series can be a sequence of terms approaching a definite limit as more of its terms are added.

A second set of overlap items is identified as being included from a first position to a third position in both a reference list and a test list, block 408. The system identifies items that are common to position ranges in both a reference list and a test list. For example, and without limitation, this can include the system identifying the overlap items for the first three positions of the reference list {a, b, c, d} and the first test list {c, a, b, d} as the items a, b, and c. In another example, the system identifies the overlap items for the first four positions of the reference list {a, b, c, d} and the first test list {c, a, b, d} as the items a, b, c, and d.

A second weighted overlap is determined by combining a corresponding weight for each item in a second set of overlap items to create a second reference item weight, combining a corresponding weight for each item that is included from a first position to a third position in a reference list to create a second reference position weight, and determining a ratio between the second reference item weight and the second reference position weight, block 410. The system determines the weight of the overlapping items based on the weights assigned to the reference list's items. By way of example and without limitation, this can include the system determining that the third reference item weight for the overlap items set {a, b, c} equals 1.8333 (1/1 for the item a, plus 1/2 for the item b, plus 1/3 for the item c), the third reference position weight for the first three positions in the reference list {a, b, c, d} equals 1.8333 (1/1 for the item a in the first position, plus 1/2 for the item b in the second position, plus 1/3 for the item c in the third position), and that the third item-weighted overlap equals 1.0 (1.8333 for the third reference item weight divided by 1.8333 for the third reference position weight). In another example, the system determines that the fourth reference item weight for the overlap items set {a, b, c, d} equals 2.08333 (1/1 for the item a, plus 1/2 for the item b, plus 1/3 for the item c, plus 1/4 for the item d), the fourth reference position weight for the first four positions in the reference list {a, b, c, d} equals 2.08333 (1/1 for the item a in the first position, plus 1/2 for the item b in the second position, plus 1/3 for the item c in the third position, plus 1/4 for the item d in the fourth position), and that the fourth item-weighted overlap equals 1.0 (2.08333 for the fourth reference item weight divided by 2.08333 for the fourth reference position weight).

Combining the corresponding weight for each item in a second set of overlap items to create a second reference item weight may include using a second convergent weight to modify a second summed reference item weight to create the second reference item weight, the first convergent weight may be a first weight in a convergent series and the second convergent weight may be a second weight in the convergent series. For example, the system determines that the third position weight equals 0.25 ($0.5^{3-1}$), the third reference item weight for the set {a, b, c} equals 1.8333 (1/1 for the item a, plus 1/2 for the item b, plus the decreasing function weight 1/3 for the item c), the third reference position weight for the first three positions in the reference list {a, b, c, d} equals 1.8333 (1/1 for the item a in the first position, plus 1/2 for the item b in the second position, plus 1/3 for the item c in the third position), and that the third item and position-weighted overlap equals 0.25 (0.25 for the third position weight, multiplied by 1.8333 for the third reference item weight, divided by 1.8333 for the third reference position weight). In another example, the system determines that the fourth position weight equals 0.125 ($0.5^{4-1}$), the fourth reference item weight for the set {a, b, c, d} equals 2.08333 (1/1 for the item a, plus 1/2 for the item b, plus 1/3 for the item c, plus the decreasing function weight 1/4 for the item d), the fourth reference position weight for the first four positions in the reference list {a, b, c, d} equals 2.08333 (1/1 for the item a in the first position, plus 1/2 for the item b in the second position, plus 1/3 for the item c in the third position, plus 1/4 for the item d in the fourth position), and that the fourth item and position-weighted overlap equals 0.125 (0.125 for the fourth position weight, multiplied by 2.08333 for the fourth reference item weight, divided by 2.08333 for the fourth reference position weight).

Having determined a first weighted overlap and a second weighted overlap, an average weighted overlap is determined based on the first weighted overlap and the second weighted overlap, block 412. The system averages the item-weighted overlaps. In embodiments, this can include the system summing the first item-weighted overlap of 0.0, plus the second item-weighted overlap of 0.666, plus the third item-weighted overlap of 1.0, plus the fourth item-weighted overlap of 1.0 for the first test list {c, a, b, d} to result in a total item-weighted overlap of 2.666 for the first test list {c, a, b, d}, then divides the total item-weighted overlap of 2.666 for the first test list {c, a, b, d} by the 4 item-weighted overlaps for the first test list {c, a, b, d} to result in an average item-weighted overlap of 0.666 for the first test list {c, a, b, d}. Although the example Asymmetric Rank-Biased Overlap calculations are described for three ranked lists which each have four ranked items for simplification purposes, these Asymmetric Rank-Biased Overlap calculations may be applied to any number of ranked lists that each have any number of ranked items.

After determining an average weighted overlap, the average weighted overlap is output as an efficiency evaluation of an information retrieval system that created a test list, block 414. The system outputs Asymmetric Rank-Biased Overlap metrics to enable efficiency evaluations of information retrieval systems. For example, and without limitation, this can include the system outputting the Asymmetric Rank-Biased Overlap metric of 0.666 for the first test list {c, a, b, d} and the Asymmetric Rank-Biased Overlap metric of 0.58333 for the second test list {c, b, a, d}, which enables a system user to evaluate the information retrieval system algorithm that provided the first test list {c, a, b, d} as more efficient than the information retrieval system algorithm that provided the second test list {c, b, a, d}. An efficiency evaluation can be the ratio of the useful work performed by a machine relative to the total resources expended.

The method 400 may be repeated as desired. Although this disclosure describes the blocks 402-414 executing in a particular order, the blocks 402-414 may be executed in a different order. In other implementations, each of the blocks 402-414 may also be executed in combination with other blocks and/or some blocks may be divided into a different set of blocks.

The following paragraphs describe the Rank-Biased Overlap metric, and they apply equally to the Asymmetric Rank-Biased Overlap metric, unless otherwise noted. The Rank-Biased Overlap metric falls in the range [0,1], where 0 means disjoint, and 1 means identical. The parameter p determines how steep the decline in weights is: the smaller p, the more top-weighted the Rank-Biased Overlap metric is. In the limit, when p=0, only the top-ranked item is considered, and the Rank-Biased Overlap metric is either zero or one. On the other hand, asp approaches arbitrarily close to 1, the weights become arbitrarily flat, and the evaluation becomes arbitrarily deep. The Rank-Biased Overlap metric has an attractive interpretation as a probabilistic user model. Consider a user comparing two ranked lists. Assume the user always looks at the first item in each ranked list. At each depth down the two ranked lists, the user has the probability p of continuing to the next item at the next position, and conversely the user has the probability 1-p of deciding to stop. Thus, the parameter p models the user's persistence. Once the user has run out of patience at depth d, the agreement between the two ranked lists at that depth is calculated and taken as the measure of similarity between the lists. Let D be the random variable giving the depth that the user stops at, and P(D=d) be the probability that the user stops at any given depth d. The expected value of this random experiment is then:

$$E[A_D] = \Sigma_{d=1}^{\infty} P(D=d) A_d. \quad \text{(Eq. 8)}$$

Since $P(D=d)=(1-p) p^{d-1}$, it follows that $E[A_D]=RBO(S,T,p)$. This probabilistic model may be extended further by observing that $A_d$ itself gives the probability that an item randomly selected from one prefix will appear in the other. Such probabilistic models help to interpret the meaning of the similarity measures achieved.

The Rank-Biased Overlap metric is defined on infinite ranked lists. Because it is convergent, the evaluation of a prefix sets a minimum and a maximum on the full score, with the range between them being the residual uncertainty attendant upon the prefix, rather than the full, evaluation. Simply calculating Equation 7 to prefix depth k (denoted as RBO@k) sets a lower bound on the full evaluation, but not a tight one. Indeed, if RBO@k>0, it is certain that RBO>RBO@k because the overlap in the prefix also contributes to all overlaps at greater depths. For all d>k, $I_d \supseteq I_k$, meaning $X_d \geq X_k$, $A_d$ is at least $X_k/d$. Thus, even if all items beyond the prefix turned out on full evaluation to be disjoint, the sum of the agreements at depths beyond k would be:

$$(1-p)\Sigma_{d=k+1}^{\infty}(X_k/d)p^{d-1} \quad \text{(Eq. 9)}$$

To set a true minimum on full evaluation, Equation 9 is added to the RBO@k score. The infinite sum may be resolved to finite form by the useful equality:

$$\Sigma_{i=1}^{\infty} p^i/i = \ln(1/(1-p)), 0 \leq p < 1 \quad \text{(Eq. 10)}$$

which is derived by integrating both sides of Equation 6. After some rearrangement:

$$RBO_{MIN}(S,T,p,k) = ((1-p)/p)(\Sigma_{d=1}^{k}(X_d-X_k) \cdot (p^d/d) - X_k \ln(1-p)) \quad \text{(Eq. 11)}$$

where k is the length of the prefix. The $RBO_{MIN}(S,T,p,k)$ value gives a tight lower bound on the full RBO(S,T,p) score. It follows from this that $RBO_{MIN}(S,T,p,k)$ is monotonically non-decreasing on deeper evaluation; that is, $$\forall j > 0, RBO_{MIN}(S,T,p,j+1) \geq RBO_{MIN}(S,T,p,j). \quad \text{(Eq. 12)}$$

Prefix evaluation can also be used to derive a tight maximum on the full Rank-Biased Overlap score. The residual uncertainty of the evaluation is then the distance between the minimum and maximum scores. The maximum score occurs when every item past prefix depth k in each ranked list matches an item in the other ranked list, beginning with those items in the prefix that were previously unmatched. Table 1 illustrates this with an example. The prefix length is k=3, and the overlap $X_k$ at this depth is 1. At each successive depth, two more items are added, one to each ranked list. Therefore, the maximum overlap increases by two until agreement is complete, which occurs at depth $f=2k-X_k$. Beyond that depth, agreement is fixed at 1.

TABLE 1

Minimum and maximum agreements between two indefinite lists at different depths, with evaluation finishing at depth 3.

| d | $S_{:d}$ | $T_{:d}$ | min($A_d$) | max($A_d$) | weight |
|---|---|---|---|---|---|
| 1 | <a> | <c> | 0/1 | 0/1 | $p^0$ |
| 2 | <ab> | <cb> | 1/2 | 1/2 | $p^0$ |
| 3 | <abd> | <cbe> | 1/3 | 1/3 | $p^0$ |
| 4 | <abd?[c]> | <cbe?[a]> | 1/4 | 3/4 | $p^0$ |
| 5 | <abd??[ce]> | <cbe??[ad]> | 1/5 | 5/5 | $p^0$ |
| 6 | <abd???[cef]> | <cbe???[adf]> | 1/6 | 6/6 | $p^0$ |
| ... | ... | ... | ... | ... | ... |
| d | <abd ... > | <cbe ... > | 1/d | d/d | $p^0$ |

Unseen items for ranks 4 through d are marked as "?".
Example hypothetical maximally agreeing items for these ranks are shown in square brackets.

The residual Rank-Biased Overlap value is therefore:

$$RBO_{RES}(S,T,p,k)=(1-p)(\Sigma_{d=k+1}^{f}(2(d-k)/d)p^{d-1}+\Sigma_{d=f+1}^{\infty}(1-X_k/d)p^{d-1} \quad \text{(Eq. 13)}$$

Rearranging, and using Equation 10 to reduce the infinite sum, results in:

$$RBO_{RES}(S,T,p,k)=p^f+(1-p)/p\{2\Sigma_{d=k+1}^{f}(d-k)p^d/d-X_k[\ln 1/(1-p)-\Sigma_{d=1}^{f}p^d/d]\} \quad \text{(Eq. 14)}$$

The residual uncertainty of prefix evaluation may be preferred to be dependent only on the prefix length, not on prefix content. This is not the case with the Rank-Biased Overlap metric, as prefix agreement determines how long it takes before the difference between the maximum and minimum agreements at subsequent depths d reaches the stationary value of $1-X_k/d$, as well as this stationary value itself. It is possible, though, to set a range on the values that $RBO_{RES}$ can take for a given prefix length, irrespective of prefix contents. The residual will be smallest when $X_k=k$, that is, when the prefix is conjoint. In this case, Equation 13 becomes:

$$RBOmin/RES(*,*,p,k)=(1-p)\Sigma_{d=k+1}^{\infty}(1-k/d)p^{d-1} \quad \text{(Eq. 15)}$$

$$=p^k-k((1-p)/p)(\ln(1/(1-p))-\Sigma_{d=1}^{k}p^d/d) \quad \text{(Eq. 16)}$$

The residual will be largest when $X_k=0$, that is, when the prefix is disjoint, resulting in:

$$RBOmax/RES(*,*,p,k)=(1-p)(\Sigma_{d=k+1}^{2k}2(d-k)/dp^{d-1}\Sigma_{d=2k+1}^{\infty}p^{d-1}) \quad \text{(Eq. 17)}$$

$$=2p^kp^{2k}-2k((1-p)/p)\Sigma_{d=k+1}^{2k}p^d/d \quad \text{(Eq. 18)}$$

It also follows that RBOmin/RES will occur when $RBO_{MAX}=1$, and RBOmax/RES will occur when $RBO_{MIN}=0$. These formulae are useful in experimental planning. For example, if two search engines are to be compared on multiple queries, then a first-page or ten-result evaluation with p=0.9 will give a maximum residual of 0.254, for a range of 0.000 to 0.254, and a minimum residual of 0.144, for a range of 0.856 to 1.000. These residuals may be decreased either by examining more results or by using a lower value of p. Prefix evaluation, then, may be used to set tight bounds upon the full Rank-Biased Overlap score, meeting one criteria for a similarity measure on indefinite ranked lists. The upper and lower limits are monotonically non-increasing and non-decreasing respectively as evaluation continues further down the two ranked lists. Also, $RBO_{RES}$ is monotonically decreasing with evaluation depth: the greater the information about the two ranked lists, the smaller the degree of uncertainty about their full similarity. These monotonic properties are what qualifies Rank-Biased Overlap to be a similarity measure on indefinite ranked lists. Because of them, the Rank-Biased Overlap metric provides consistent values for whatever evaluation depth k happens to be chosen, and maintains consistency as this evaluation depth increases. Moreover, the score at any depth of partial evaluation gives strict limits on the score that would be achieved by full evaluation. In contrast, top-k measures are measures only on the lists to depth k, and provide no bounds on the value of full evaluation. Even with partial evaluation, Rank-Biased Overlap is a measure on the full ranked lists.

The agreement at each depth d under Rank-Biased Overlap is assigned a weight. This weight, however, is not the same as the weight that the items at rank d themselves take, as these items contribute to multiple agreements. A formula is derived for the weight of each rank under Rank-Biased Overlap. From this, the weight of a prefix may be calculated, which in turn helps guide the choice of the p parameter in the Rank-Biased Overlap evaluation. The pair of items at depth d makes no contribution to partial agreements prior to d, takes up 1/dth of $A_d$, 1/(d+1)th of $A_{d+1}$, and so forth. Their precise contribution to the overall score depends on which depth, if any, they are matched at. Consider the difference in the final score between, on the one hand, both items at depth d being matched at or prior to depth d (maximum agreement), and, on the other, neither item being matched at infinite depth (minimum agreement). This difference may be referred to as the weight of rank d, denoted as WRBO(d). Accounting for the weighting of the agreements $w_d=(1-p)p^{d-1}$ (Equation 7), the weight of rank d under Rank-Biased Overlap is therefore:

$$WRBO(d)=((1-p)/p)\Sigma_{i=d}^{\infty} p^i/i \quad \text{(Eq. 19)}$$

The weight of the prefix of length d, WRBO(1:d), is then the sum of the weights of the ranks to that depth:

$$WRBO(1:d)=\Sigma_{j=1}^{d} WRBO(d)=((1-p)/p)\Sigma_{j=1}^{d}\Sigma_{i=j}^{\infty} p^i/i \quad \text{(Eq. 20)}$$

which after some rearrangement, and using Equation 10 to resolve the infinite sum, results in:

$$WRBO(1:d)=1-p^{d-1}+(1-p)/pd(\ln(1/(1-p))-\Sigma_{i=1}^{d-1} p^i/i) \quad \text{(Eq. 21)}$$

The weight of the tail, WRBO(d+1: ∞), is 1−WRBO(1:d). Since WRBO(1:d) is invariant on the length of the list, it follows that the weight of the infinite tail does not dominate that of the finite head. Equation 21 helps inform the choice of the p parameter, which determines the degree of top-weightiness of the Rank-Biased Overlap metric. For instance, p=0.9 means that the first 10 ranks have 86% of the weight of the evaluation; to give the top 50 ranks the same weight involves taking p=0.98 as the setting. Thus, an experimenter can tune the metric to achieve a given weight for a certain length of prefix.

The Rank-Biased Overlap score can then be quoted either as base+residual or as a min-max range. For many practical and statistical applications, though, it is desirable or necessary to have a single score or point estimate, rather than a range of values. The simplest method is to use the base Rank-Biased Overlap value as the single score for the partial evaluation. The base score gives the known similarity between the two lists, the most that may be said with certainty given the information available. However, the base score is dependent on the evaluation depth, k. The highest base score that may be achieved for depth k evaluation using persistence p is:

$$1-p^k-k(1-p)/p(\Sigma_{d=1}^{k} p^d/d+\ln(1-p)) \quad \text{(Eq. 22)}$$

which, for large p and small k, is well short of 1. There are practical situations in which a list is conceptually indefinite but where only the first few items are available. For instance, if two search engines each only supply 7 results to a query, and the p parameter employed is 0.9, then even if both results lists are identical (to the supplied depth), the base Rank-Biased Overlap score will only be 0.767. In such situations, base Rank-Biased Overlap can easily become a measure of result list length, not difference. An alternative formulation for a single Rank-Biased Overlap score is to extrapolate from the visible lists, assuming that the degree of agreement seen up to depth k is continued indefinitely. Denote as $RBO_{EXT}$ the result of such an extrapolation. To derive a direct formula for $RBO_{EXT}$, start from Equation 9, which gives the adjustment to the Rank-Biased Overlap value, calculated on the k seen items, to make it a true minimum value. The assumption for the lower bound is that the remaining items are all non-conjoint, so that the agreement at ranks r>k is $X_k/r$. Instead, extrapolation assumes that the degree of agreement seen at k is expected to continue to higher ranks, that is, that for r>k, $A_r=X_k/k$. The resulting agreement values may not in reality be possible, because they would require fractional overlap. Consider, though, the analogy of the expected value of a random experiment not having to be a possible outcome of that experiment; for instance, the expected value of rolling a fair six-sided die is 3.5. Constant agreement considerably simplifies things, resulting in:

$$RBO_{EXT}(S,T,p,k)=X^k/k p^k((1-p)/p)\Sigma_{d=1}^{k}(X^d/d)p^d. \quad \text{(Eq. 23)}$$

It should be noted that this is not equivalent to simply extrapolating a score between the numeric values of $RBO_{MIN}$ and $RBO_{MAX}$. Since those scores are weighted to higher ranks, such an extrapolation would also be weighted to the agreement observed in higher ranks.

Instead, $RBO_{EXT}$ extrapolates out from $A_k$, that is, the agreement observed at evaluation depth k. Extrapolated Rank-Biased Overlap is not monotonic; it could either increase or decrease as the prefix lengthens. However, $RBO_{EXT}$ will always increase with increasing agreement and decrease with decreasing agreement. That is, if $A_{d+1}>A_d$ then $RBO_{EXT}(d+1)>RBO_{EXT}(d)$, and conversely if $A_{d+1}<A_d$ then $RBO_{EXT}(d+1)<RBO_{EXT}(d)$, for all d>0. $RBO_{EXT}$ is bounded, by $RBO_{MIN}$ and $RBO_{MAX}$. Where a point score is needed, there is the choice of $RBO_{BASE}$ or $RBO_{EXT}$. In many cases, evaluation will be performed deeply enough, and p will be small enough (say, p≤0.9 and depth of 50), that the residual disappears at normal reporting fidelity, leaving $RBO_{EXT}$ and $RBO_{BASE}$ as indistinguishable and almost-exact estimates of the true Rank-Biased Overlap score. Where the residual is noticeable, $RBO_{EXT}$ should in general be the preferred point estimate, in part because it is less sensitive than $RBO_{BASE}$ to the actual evaluation depth, which may vary between different ranking pairs in the one experiment. For noticeable residuals, the full reporting format is $RBO_{EXT}$ [$RBO_{MIN}$–$RBO_{MAX}$].

Ties may be handled by assuming that, if t items are tied for ranks d to d+(t−1), they all occur at rank d. To support this, the definition of agreement given in Equation 3 may be modified:

$$A_{S,T,d} = 2X_{S,T,d}/(|S_{:d}|+|T_{:d}|) \quad \text{(Eq. 24)}$$

Equations 3 and 24 are equivalent in the absence of ties extending over rank d, but in the presence of such ties, the former formulation can lead to agreements greater than 1. It occasionally happens that indefinite ranked lists are compared with different evaluation depths on each ranked list. One cause of such irregularity is that the providers of the ranked lists are returning ranked lists shorter than the evaluation depth chosen for the assessment and different from each other. Such ranked lists may be referred to as uneven ranked lists. For instance, for an obscure but not entirely nonsensical query, one public search engine might return five results, another might return seven. These can still be treated as indefinite ranked lists; there are many more web pages beyond these depths, but they have not met the engine's threshold of estimated relevance. For the following discussion, L is the longer of the two ranked lists, with length l, and S be the shorter ranked list, with length s. The formula for $RBO_{MIN}$ given in Equation 11 handles uneven rankings without modification, since it is implicitly assumed that $\forall d \in \{s+1, \ldots, l\}, S_d \subseteq L$; that is, maximal disjointness is assumed. Conversely, $RBO_{MAX}$ is found by assuming that every item in the extension of S matches one item in L, increasing the overlap by one. Therefore, $\forall d \varepsilon \{s+1, \ldots, l\}$, $X^{max}_d - X^{min}_d = d-s$, regardless of the contents of the preceding ranked lists. The definition of $RBO_{RES}$ on uneven ranked lists then becomes:

$$RBO_{RES}(L,S,l,s) = ((1-p)/p)(\Sigma_{d=s+1}^{l}(d-s)p^d/d + \Sigma_{d=l+1}^{f}(2d-1-s)p^d/d + \Sigma_{d=f-1}^{\infty}(1-X_l/d)p^d) \quad \text{(Eq.25)}$$

where $f = 1+s-X_l$ is the rank at which maximum agreement becomes 1. Removing the infinite sum using Equation 10 once again, and simplifying, results in:

$$RBO_{RES}(L,S,l,s) = p^s + p^l - p^f - ((1-p)/p)(s\Sigma_{d=s+1}^{f}(p^d/d) + l\Sigma_{d=l+1}^{f}(p^d/d) + X_l[\ln 1/(1-p) - \Sigma d = 1^f p^d/d]) \quad \text{(Eq.26)}$$

Modifying $RBO_{EXT}$ to handle uneven ranked lists is less straightforward. The extrapolation for even ranked lists is achieved by assuming the agreement in the unseen part of the ranked lists is the same as in the prefixes. However, agreement between L and S is not known to depth l. And while agreement to depth s is known, truncation at this depth loses information on the degree of overlap between L(s+1):l and S. Therefore, extrapolation for uneven rankings must separately extrapolate agreement for S(s+1):l.

Consider the method of extrapolation for even ranked lists. The agreement $A_k$ at common evaluation depth k is assumed to continue unchanged at further evaluation depths. In other words, $\forall d>k$, $A_d = A_k$, and specifically $A_{k+1} = A_k$. Referring to the definition of agreement in Equation 3, this means that:

$$|S_{:k+1} \cap T_{:k+1}| =^{def} X_{k+1} = X_k + A_k \quad \text{(Eq. 27)}$$

If $0 < A_k < 1$, which is generally the case, then working backwards through the formula implicitly requires $X_d > k$ to take on fractional values. This suggests the concept of degree of set membership. An item occurring in the seen prefix will have a membership degree of 1 or 0, depending on whether it is matched in the other ranked list at the current evaluation depth. An unseen item, however, is assigned under extrapolation a (usually fractional) membership degree; conceptually a "probability of membership." The items $S_{k+1}$ and $T_{k+1}$ in Equation 27, for even ranked lists, each have membership $A_k$. In the case of uneven lists, the conjointness of L(s+1):l is known to be either 0 or 1. Nevertheless, the membership of the unseen items S(s+1):l can still be set to $A_s$. This will provide an assumed $A_l$, which may be extrapolated for items beyond depth l, unseen in both ranked lists. The formula then is:

$$RBO_{EXT}(L,S,l,s) = ((1-p)/p)(\Sigma_{d=1}^{l}(X_d/d)p^d + \Sigma_{d=s+1}^{l}X_s(d-s)p^d/sd) + ((X_l - X_s)/l + X_s/s)p^l \quad \text{(Eq. 28)}$$

Note that $X_l$ here means the overlap on the seen lists at depth l, even though $|S| < l$; the maximum value of $X_l$ is therefore s. Calculating $RBO_{EXT}$ on uneven ranked lists in this way maintains two important criteria met by extrapolation on even lists. First, $RBO_{MIN} \leq RBO_{EXT} \leq RBO_{MAX}$. And second, $RBO_{EXT}$ is non-increasing with deeper evaluation if $S_{s+1}$ or $L_{l+1}$ is found to be disjoint, and non-decreasing if the item is found to be conjoint.

The Rank-Biased Overlap Equation 28 may be modified to become an Asymmetrical Rank-Biased Overlap Equation 28A:

$$ARBO_{EXT}(L,S,l,s) = ((1-p)/p)(\Sigma_{d=1}^{l}(Xdp^d)/SW_d + \Sigma_{d=s+1}^{l}Xs(SW_d - SW_s)p^d/(SW_d SW_s)) + (((Xl-Xs)/SW_l) + Xs/SW_s)p^l \quad \text{(Eq. 28A)}$$

where $SW_k = \Sigma_{d=1}^{k} W_d$

To support uneven ranked lists' sizes, the Rank-Biased Overlap metric compensates the score. If the first items in the test list are in the same order as the first items reference list, but the test list is missing some of the last items in the reference list, then the Rank-Biased Overlap metric would still calculate the perfect similarity metric of 1.0 for the test list. For example, if the reference list $L_{ref}$ is {a, b, c, d} and the test list $L_1$ is {a, b}, then the Rank-Biased Overlap metric calculates the metric of 1.0 for the test list $L_1$. The Rank-Biased Overlap equation is $RBO_{EXT}(L, S, l, s) = ((1-p)/p) (\Sigma_{d=1}^{l} Xd\ p^d/d + \Sigma_{d=s+1}^{l} Xs\ (d-s)\ p^d/sd) + ((Xl-Xs)/l + Xs/s)\ p^l$. The equation parts $[\Sigma_{d=s+1}^{l} Xs\ (d-s)\ p^d/sd]$ and $[((Xl-Xs)/l + Xs/s)\ p^l]$ compensate the overlap sum when the lists have uneven sizes.

If the test list is smaller than the reference list, the metric should reflect that some items in the reference list are missing from the test list. Since the Rank-Biased Overlap metric is symmetrical, by design it compensates the test ranked list size and gives a perfect metric if the smaller test list contains the first items of the reference list in order. The Asymmetric Rank-Biased Overlap metric simply considers that the test list has at least the same size as the reference list, padding the test list with non-matching items. So eventually the test list size is always equal to or larger than the reference list. In practice the Asymmetric Rank-Biased Overlap implementation does not need to modify the test list, it only simulates a longer size for the test list.

System Overview

Figure 5:
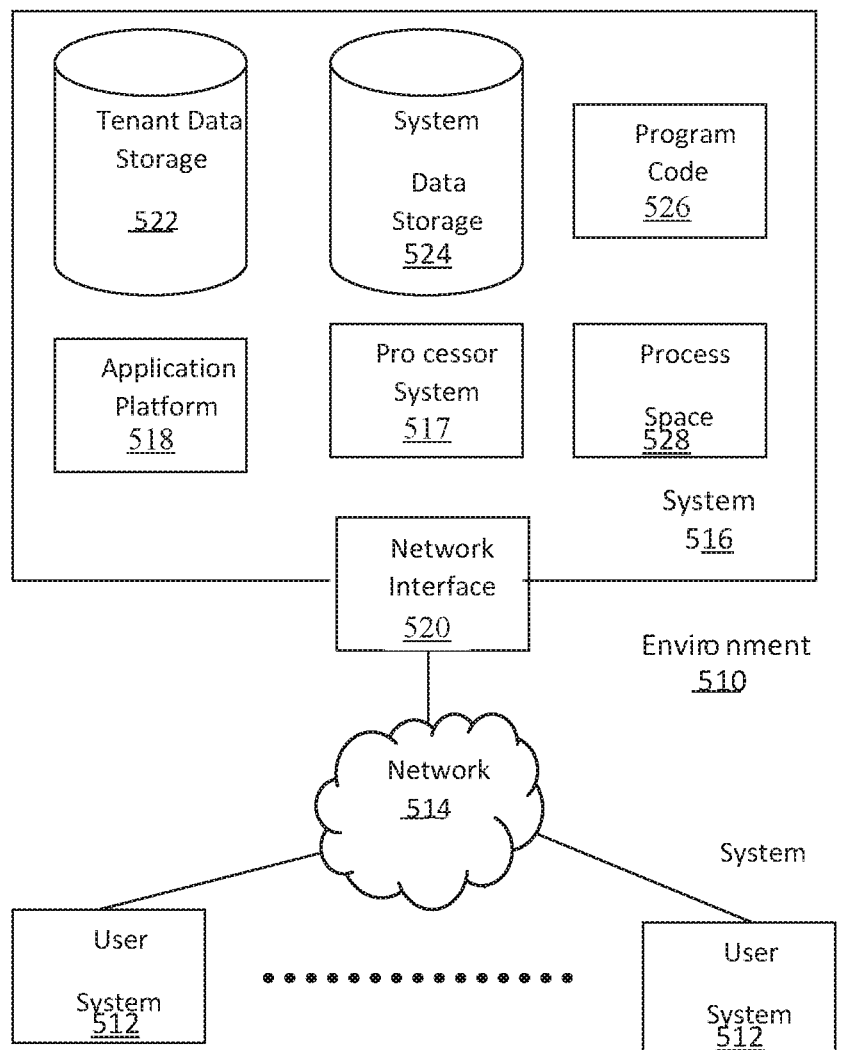
FIG. 5 illustrates a block diagram of an example of an environment wherein an on-demand database service might be used.

FIG. 5 illustrates a block diagram of an environment 510 wherein an on-demand database service might be used. The environment 510 may include user systems 512, a network 514, a system 516, a processor system 517, an application platform 518, a network interface 520, a tenant data storage 522, a system data storage 524, program code 526, and a process space 528. In other embodiments, the environment 510 may not have all of the components listed and/or may have other elements instead of, or in addition to, those listed above.

The environment 510 is an environment in which an on-demand database service exists. A user system 512 may be any machine or system that is used by a user to access a database user system. For example, any of the user systems 512 may be a handheld computing device, a mobile phone, a laptop computer, a work station, and/or a network of computing devices. As illustrated in FIG. 5 (and in more detail in FIG. 6) the user systems 512 might interact via the network 514 with an on-demand database service, which is the system 516.

An on-demand database service, such as the system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 516" and the "system 516" will be used interchangeably herein. A database image may include one or more database objects. A relational database management system (RDMS) or the equivalent may execute storage and retrieval of information against the database object(s). The application platform 518 may be a framework that allows the applications of the system 516 to run, such as the hardware and/or software, e.g., the operating system. In an embodiment, the on-demand database service 516 may include the application platform 518 which enables creation, managing and executing one or more applications developed by the provider of the on-demand database service, users accessing the on-demand database service via user systems 512, or third-party application developers accessing the on-demand database service via the user systems 512.

The users of the user systems 512 may differ in their respective capacities, and the capacity of a particular user system 512 might be entirely determined by permissions (permission levels) for the current user. For example, where a salesperson is using a particular user system 512 to interact with the system 516, that user system 512 has the capacities allotted to that salesperson. However, while an administrator is using that user system 512 to interact with the system 516, that user system 512 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 514 is any network or combination of networks of devices that communicate with one another. For example, the network 514 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 512 might communicate with the system 516 using TCP/IP and, at a higher network level, use other common Internet protocols to communicate, such as HTTP, FTP, AFS, WAP, etc. In an example where HTTP is used, the user systems 512 might include an HTTP client commonly referred to as a "browser" for sending and receiving HTTP messages to and from an HTTP server at the system 516. Such an HTTP server might be implemented as the sole network interface between the system 516 and the network 514, but other techniques might be used as well or instead. In some implementations, the interface between the system 516 and the network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 516, shown in FIG. 5, implements a web-based customer relationship management (CRM) system. For example, in one embodiment, the system 516 includes application servers configured to implement and execute CRM software applications as well as provide related data, code, forms, webpages and other information to and from the user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 516 implements applications other than, or in addition to, a CRM application. For example, the system 516 may provide tenant access to multiple hosted (standard and custom) applications, including a CRM application. User (or third-party developer) applications, which may or may not include CRM, may be supported by the application platform 518, which manages creation, storage of the applications into one or more database objects and executing of the applications in a virtual machine in the process space of the system 516.

One arrangement for elements of the system 516 is shown in FIG. 5, including the network interface 520, the application platform 518, the tenant data storage 522 for tenant data 523, the system data storage 524 for system data 525 accessible to the system 516 and possibly multiple tenants, the program code 526 for implementing various functions of the system 516, and the process space 528 for executing MTS system processes and tenant-specific processes, such as running applications as part of an application hosting service. Additional processes that may execute on the system 516 include database indexing processes.

Several elements in the system shown in FIG. 5 include conventional, well-known elements that are explained only briefly here. For example, each of the user systems 512 could include a desktop personal computer, workstation, laptop, PDA, cell phone, or any wireless access protocol (WAP) enabled device or any other computing device capable of interfacing directly or indirectly to the Internet or other network connection. Each of the user systems 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 512 to access, process and view information, pages and applications available to it from the system 516 over the network 514. Each of the user systems 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 516 or other systems or servers. For example, the user interface device may be used to access data and applications hosted by the system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 512 and all of its components are operator configurable using applications, such as a browser, including computer code run using a central processing unit such as an Intel Pentium® processor or the like. Similarly, the system 516 (and additional instances of an MTS, where more than one is present) and all of their components might be operator configurable using application(s) including computer code to run using a central processing unit such as the processor system 517, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 516 is configured to provide webpages, forms, applications, data and media content to the user (client) systems 512 to support the access by the user systems 512 as tenants of the system 516. As such, the system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 6:
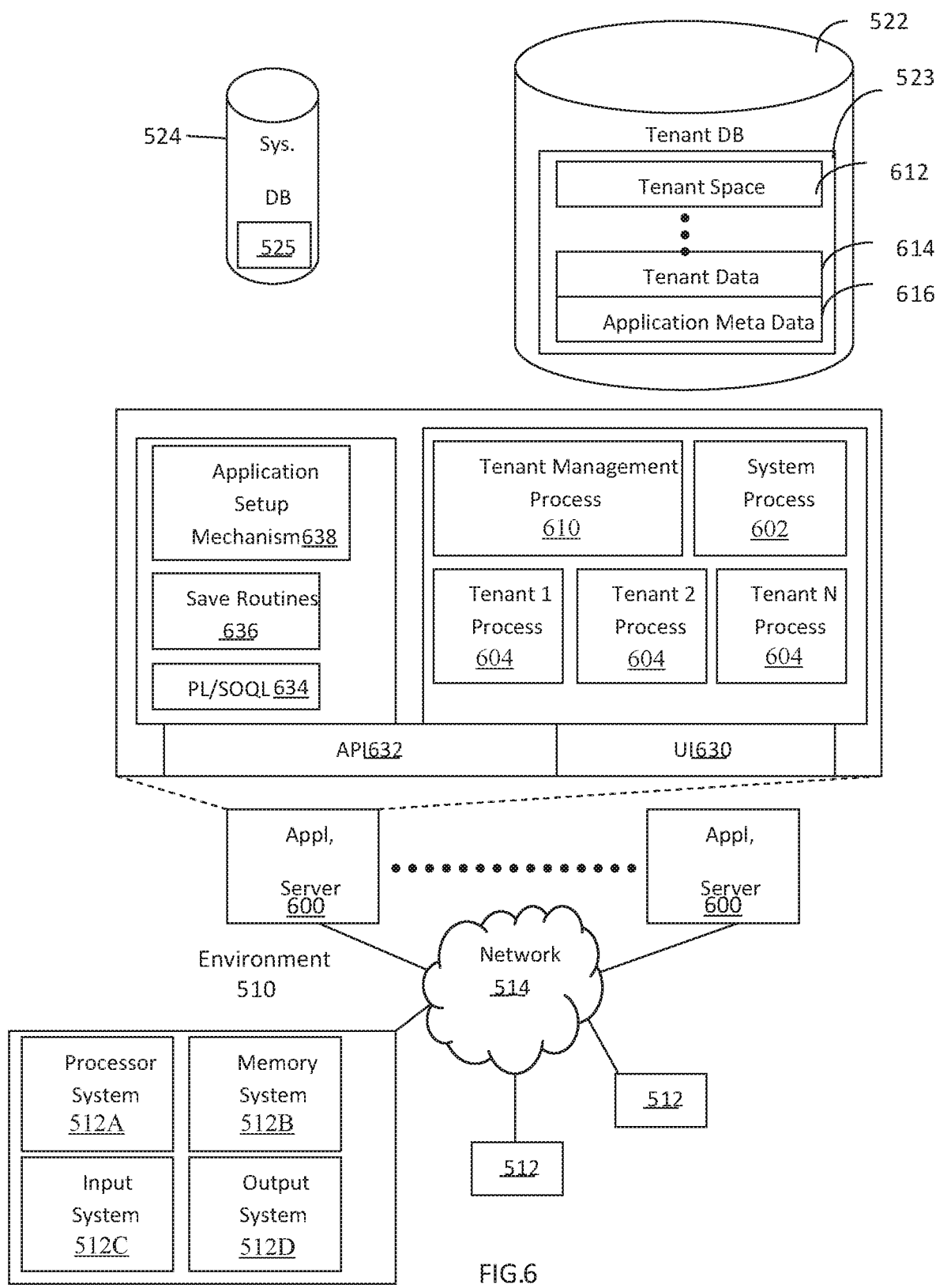
FIG. 6 illustrates a block diagram of an embodiment of elements of FIG. 5 and various possible interconnections between these elements.

FIG. 6 also illustrates the environment 510. However, in FIG. 6 elements of the system 516 and various interconnections in an embodiment are further illustrated. FIG. 6 shows that the each of the user systems 512 may include a processor system 512A, a memory system 512B, an input system 512C, and an output system 512D. FIG. 6 shows the network 514 and the system 516. FIG. 6 also shows that the system 516 may include the tenant data storage 522, the tenant data 523, the system data storage 524, the system data 525, a User Interface (UI) 630, an Application Program Interface (API) 632, a PL/SOQL 634, save routines 636, an application setup mechanism 638, applications servers 6001-600N, a system process space 602, tenant process spaces 604, a tenant management process space 610, a tenant storage area 612, a user storage 614, and application metadata 616. In other embodiments, the environment 510 may not have the same elements as those listed above and/or may have other elements instead of, or in addition to, those listed above.

The user systems 512, the network 514, the system 516, the tenant data storage 522, and the system data storage 524 were discussed above in FIG. 5. Regarding the user systems 512, the processor system 512A may be any combination of one or more processors. The memory system 512B may be any combination of one or more memory devices, short term, and/or long-term memory. The input system 512C may be any combination of input devices, such as one or more keyboards, mice, trackballs, scanners, cameras, and/or interfaces to networks. The output system 512D may be any combination of output devices, such as one or more monitors, printers, and/or interfaces to networks. As shown by FIG. 6, the system 516 may include the network interface 520 (of FIG. 5) implemented as a set of HTTP application servers 600, the application platform 518, the tenant data storage 522, and the system data storage 524. Also shown is the system process space 602, including individual tenant process spaces 604 and the tenant management process space 610. Each application server 600 may be configured to access tenant data storage 522 and the tenant data 523 therein, and the system data storage 524 and the system data 525 therein to serve requests of the user systems 512. The tenant data 523 might be divided into individual tenant storage areas 612, which may be either a physical arrangement and/or a logical arrangement of data. Within each tenant storage area 612, the user storage 614 and the application metadata 616 might be similarly allocated for each user. For example, a copy of a user's most recently used (MRU) items might be stored to the user storage 614. Similarly, a copy of MRU items for an entire organization that is a tenant might be stored to the tenant storage area 612. The UI 630 provides a user interface and the API 632 provides an application programmer interface to the system 516 resident processes to users and/or developers at the user systems 512. The tenant data and the system data may be stored in various databases, such as one or more Oracle™ databases.

The application platform 518 includes the application setup mechanism 638 that supports application developers' creation and management of applications, which may be saved as metadata into the tenant data storage 522 by the save routines 636 for execution by subscribers as one or more tenant process spaces 604 managed by the tenant management process 610 for example. Invocations to such applications may be coded using the PL/SOQL 634 that provides a programming language style interface extension to the API 632. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 616 for the subscriber making the invocation and executing the metadata as an application in a virtual machine.

Each application server 600 may be communicably coupled to database systems, e.g., having access to the system data 525 and the tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also may be used. For example, in certain embodiments, three consecutive requests from the same user could hit three different application servers 600, and three requests from different users could hit the same application server 600. In this manner, the system 516 is multi-tenant, wherein the system 516 handles storage of, and access to, different objects, data and applications across disparate users and organizations.

As an example of storage, one tenant might be a company that employs a sales force where each salesperson uses the system 516 to manage their sales process. Thus, a user might maintain contact data, leads data, customer follow-up data, performance data, goals and progress data, etc., all applicable to that user's personal sales process (e.g., in the tenant data storage 522). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 516 might also maintain system level data usable by multiple tenants or other data. Such system level data might include industry reports, news, postings, and the like that are sharable among tenants.

In certain embodiments, the user systems 512 (which may be client systems) communicate with the application servers 600 to request and update system-level and tenant-level data from the system 516 that may require sending one or more queries to the tenant data storage 522 and/or the system data storage 524. The system 516 (e.g., an application server 600 in the system 516) automatically generates one or more SQL statements (e.g., one or more SQL queries) that are designed to access the desired information. The system data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc.

Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
   one or more processors; and
   a non-transitory computer readable medium storing a plurality of instructions, which when executed, cause the one or more processors to:
   associate a first weight with a first item in a reference list, a second weight with a second item in the reference list, and a third weight with a third item in the reference list, the third weight being less than the second weight, and the second weight being less than the first weight;
   identify a first set of overlap items that are included from a first position to a second position in both the reference list and a test list;
   determine a first weighted overlap by combining a corresponding weight for each item in the first set of overlap items to create a first reference item weight, combining a corresponding weight for each item that is included from the first position to the second position in the reference list to create a first reference position weight, and determining a ratio between the first reference item weight and the first reference position weight;
   identify a second set of overlap items that are included from the first position to a third position in both the reference list and the test list;
   determine a second weighted overlap by combining a corresponding weight for each item in the second set of overlap items to create a second reference item weight, combining a corresponding weight for each item that is included from the first position to the third position in the reference list to create a second reference position weight, and determining a ratio between the second reference item weight and the second reference position weight;
   determine an average weighted overlap based on the first weighted overlap and the second weighted overlap; and
   output the average weighted overlap as an efficiency evaluation of an information retrieval system that created the test list.

2. The system of claim 1, wherein the first item is in an item sequence in the reference list before the second item, the second item is in the item sequence in the reference list before the third item, the first item is ranked higher in the item sequence in the reference list than the second item is ranked in the item sequence in the reference list, and the second item is ranked higher in the item sequence in the reference list than the third item is ranked in the item sequence in the reference list.

3. The system of claim 1, wherein the first position is in a positional sequence in the reference list before the second position, and the second position is in the positional sequence in the reference list before the third position.

4. The system of claim 1, wherein the first position precedes all other positions in the reference list.

5. The system of claim 1, wherein the first position comprises one of a same position as the second position and a different position from the second position.

6. The system of claim 1, wherein the reference list is created by one of another information retrieval system and an algorithm used by the information retrieval system that differs from an algorithm used by the information retrieval system to create the test list.

7. The system of claim 1, wherein combining the corresponding weight for each item in the first set of overlap items to create the first reference item weight comprises using a first convergent weight to modify a first summed reference item weight to create the first reference item weight, and combining the corresponding weight for each item in the second set of overlap items to create the second reference item weight comprises using a second convergent weight to modify a second summed reference item weight to create the second reference item weight, the first convergent weight being a first weight in a convergent series and the second convergent weight being a second weight in the convergent series.

8. A computer program product comprising computer-readable program code to be executed by one or more processors when retrieved from a non-transitory computer-readable medium, the program code including instructions to:
   associate a first weight with a first item in a reference list, a second weight with a second item in the reference list, and a third weight with a third item in the reference list, the third weight being less than the second weight, and the second weight being less than the first weight;
   identify a first set of overlap items that are included from a first position to a second position in both the reference list and a test list;
   determine a first weighted overlap by combining a corresponding weight for each item in the first set of overlap items to create a first reference item weight, combining a corresponding weight for each item that is included from the first position to the second position in the reference list to create a first reference position weight, and determining a ratio between the first reference item weight and the first reference position weight;

identify a second set of overlap items that are included from the first position to a third position in both the reference list and the test list;

determine a second weighted overlap by combining a corresponding weight for each item in the second set of overlap items to create a second reference item weight, combining a corresponding weight for each item that is included from the first position to the third position in the reference list to create a second reference position weight, and determining a ratio between the second reference item weight and the second reference position weight;

determine an average weighted overlap based on the first weighted overlap and the second weighted overlap; and output the average weighted overlap as an efficiency evaluation of an information retrieval system that created the test list.

9. The computer program product of claim 8, wherein the first item is in an item sequence in the reference list before the second item, the second item is in the item sequence in the reference list before the third item, the first item is ranked higher in the item sequence in the reference list than the second item is ranked in the item sequence in the reference list, and the second item is ranked higher in the item sequence in the reference list than the third item is ranked in the item sequence in the reference list.

10. The computer program product of claim 8, wherein the first position is in a positional sequence in the reference list before the second position, and the second position is in the positional sequence in the reference list before the third position.

11. The computer program product of claim 8, wherein the first position precedes all other positions in the reference list, and the first position comprises one of a same position as the second position and a different position from the second position.

12. The computer program product of claim 8, wherein the reference list is created by one of another information retrieval system and an algorithm used by the information retrieval system that differs from an algorithm used by the information retrieval system to create the test list.

13. The computer program product of claim 8, wherein combining the corresponding weight for each item in the first set of overlap items to create the first reference item weight comprises using a first convergent weight to modify a first summed reference item weight to create the first reference item weight, and combining the corresponding weight for each item in the second set of overlap items to create the second reference item weight comprises using a second convergent weight to modify a second summed reference item weight to create the second reference item weight, the first convergent weight being a first weight in a convergent series and the second convergent weight being a second weight in the convergent series.

14. A method comprising:

associating a first weight with a first item in a reference list, a second weight with a second item in the reference list, and a third weight with a third item in the reference list, the third weight being less than the second weight, and the second weight being less than the first weight;

identifying a first set of overlap items that are included from a first position to a second position in both the reference list and a test list;

determining a first weighted overlap by combining a corresponding weight for each item in the first set of overlap items to create a first reference item weight, combining a corresponding weight for each item that is included from the first position to the second position in the reference list to create a first reference position weight, and determining a ratio between the first reference item weight and the first reference position weight;

identifying a second set of overlap items that are included from the first position to a third position in both the reference list and the test list;

determining a second weighted overlap by combining a corresponding weight for each item in the second set of overlap items to create a second reference item weight, combining a corresponding weight for each item that is included from the first position to the third position in the reference list to create a second reference position weight, and determining a ratio between the second reference item weight and the second reference position weight;

determining an average weighted overlap based on the first weighted overlap and the second weighted overlap; and outputting the average weighted overlap as an efficiency evaluation of an information retrieval system that created the test list.

15. The method of claim 14, wherein the first item is in an item sequence in the reference list before the second item, the second item is in the item sequence in the reference list before the third item, the first item is ranked higher in the item sequence in the reference list than the second item is ranked in the item sequence in the reference list, and the second item is ranked higher in the item sequence in the reference list than the third item is ranked in the item sequence in the reference list.

16. The method of claim 14, wherein the first position is in a positional sequence in the reference list before the second position, and the second position is in the positional sequence in the reference list before the third position.

17. The method of claim 14, wherein the first position precedes all other positions in the reference list.

18. The method of claim 14, wherein the first position comprises one of a same position as the second position and a different position from the second position.

19. The method of claim 14, wherein the reference list is created by one of another information retrieval system and an algorithm used by the information retrieval system that differs from an algorithm used by the information retrieval system to create the test list.

20. The method of claim 14, wherein combining the corresponding weight for each item in the first set of overlap items to create the first reference item weight comprises using a first convergent weight to modify a first summed reference item weight to create the first reference item weight, and combining the corresponding weight for each item in the second set of overlap items to create the second reference item weight comprises using a second convergent weight to modify a second summed reference item weight to create the second reference item weight, the first convergent weight being a first weight in a convergent series and the second convergent weight being a second weight in the convergent series.

* * * * *